US009659326B2

(12) United States Patent
Evans

(10) Patent No.: US 9,659,326 B2
(45) Date of Patent: May 23, 2017

(54) SYSTEM AND METHOD FOR DEBT PRESENTMENT AND RESOLUTION

(75) Inventor: Scott L. Evans, Bay Harbor Islands, FL (US)

(73) Assignee: Collections Marketing Center, Inc., Wilmington, DE (US)

(*) Notice: Subject to any disclaimer, the term of this patent is extended or adjusted under 35 U.S.C. 154(b) by 873 days.

(21) Appl. No.: 13/294,830

(22) Filed: Nov. 11, 2011

(65) Prior Publication Data
US 2012/0191595 A1 Jul. 26, 2012

Related U.S. Application Data

(63) Continuation of application No. 13/282,834, filed on Oct. 27, 2011, now abandoned, which is a
(Continued)

(51) Int. Cl.
G06Q 50/18 (2012.01)
G06Q 40/00 (2012.01)
(Continued)

(52) U.S. Cl.
CPC ........... G06Q 40/00 (2013.01); G06Q 20/102 (2013.01); G06Q 20/108 (2013.01); G06Q 20/14 (2013.01); G06Q 40/02 (2013.01); G06Q 40/025 (2013.01)

(58) Field of Classification Search
CPC .. G06Q 20/102; G06Q 40/025; G06Q 50/188; H04M 15/44; H04M 15/745; H04M 2215/0104
See application file for complete search history.

(56) References Cited

U.S. PATENT DOCUMENTS 5,144,654 A 9/1992 Kelley et al.
5,220,501 A 6/1993 Lawlor et al.
(Continued)

FOREIGN PATENT DOCUMENTS

JP 04 239970 8/1992
JP 2001-250027 9/2001
(Continued)

OTHER PUBLICATIONS

Imrey, Christopher, "QA's: Web-Based Collections." *Collections & Credit Risk*; Jun. 2006; 11,6; Banking Information Source, p. 18.
(Continued)

*Primary Examiner* — Ryan Zeender
*Assistant Examiner* — Dana Amsdell
(74) *Attorney, Agent, or Firm* — Young Conaway Stargatt & Taylor LLP; James M. Lennon

(57) ABSTRACT

A system and method for debt presentment and resolution through an Intranet or Internet content provider is disclosed. Said system and method include a plurality of "transaction communities" which are electronic forums allowing interaction between a plurality of debtors and creditors through means of electronic mail (e-mail) or other electronic communication means. The Internet/Intranet based software application allows said debtors to access and input information related to a particular debt with any Internet browser software. Said debtors are provided with the URL (Universal Resource Locator) for said content provider along with a unique identification code from the collection agency(s) through mail correspondence or other communication means. Upon said user entering said URL and entering said identification code, said user may then proceed to choose from a variety of settlement options listed on the HTML (HyperText Markup Language) page.

3 Claims, 37 Drawing Sheets

Related U.S. Application Data continuation of application No. 13/010,744, filed on Jan. 20, 2011, now abandoned, which is a continuation of application No. 10/329,302, filed on Dec. 23, 2002, now abandoned, which is a continuation-in-part of application No. 09/267,840, filed on Mar. 12, 1999, now abandoned.

(51) Int. Cl.
*G06Q 20/10* (2012.01)
*G06Q 20/14* (2012.01)
*G06Q 40/02* (2012.01)
*H04M 15/00* (2006.01)

(56) References Cited

U.S. PATENT DOCUMENTS

| | | | |
|---|---|---|---|
| 5,274,547 A | 12/1993 | Zoffel et al. | |
| 5,283,829 A | 2/1994 | Anderson | |
| 5,381,470 A | 1/1995 | Cambray et al. | |
| 5,383,113 A | 1/1995 | Kight et al. | |
| 5,465,206 A | 11/1995 | Hilt et al. | |
| 5,483,445 A | 1/1996 | Pickering | |
| 5,504,677 A | 4/1996 | Pollin | |
| 5,557,518 A | 9/1996 | Rosen | |
| 5,577,112 A | 11/1996 | Cambray et al. | |
| 5,616,902 A | 4/1997 | Cooley et al. | |
| 5,621,640 A | 4/1997 | Burke | |
| 5,623,662 A | 4/1997 | McIntosh | |
| 5,644,727 A | 7/1997 | Atkins | |
| 5,649,117 A * | 7/1997 | Landry | G06Q 20/04 705/40 |
| 5,652,786 A | 7/1997 | Rogers | |
| 5,655,008 A | 8/1997 | Futch et al. | |
| 5,655,089 A | 8/1997 | Bucci | |
| 5,684,965 A | 11/1997 | Pickering | |
| 5,696,366 A | 12/1997 | Ziarno | |
| 5,696,906 A | 12/1997 | Peters et al. | |
| 5,699,528 A | 12/1997 | Hogan | |
| 5,708,422 A | 1/1998 | Blonder et al. | |
| 5,710,887 A | 1/1998 | Chelliah et al. | |
| 5,715,298 A | 2/1998 | Rogers | |
| 5,715,399 A | 2/1998 | Bezos | |
| 5,724,521 A | 3/1998 | Dedrick | |
| 5,724,584 A | 3/1998 | Peters et al. | |
| 5,727,249 A | 3/1998 | Pollin | |
| 5,729,594 A | 3/1998 | Klingman | |
| 5,732,400 A | 3/1998 | Mandler et al. | |
| 5,734,828 A | 3/1998 | Pendse et al. | |
| 5,737,414 A | 4/1998 | Walker et al. | |
| 5,739,512 A | 4/1998 | Tognazzini | |
| 5,822,400 A | 10/1998 | Smith | |
| 5,832,460 A | 11/1998 | Bednar et al. | |
| 5,856,700 A | 1/1999 | Woodbury | |
| 5,901,067 A | 5/1999 | Kao et al. | |
| 5,920,847 A | 7/1999 | Kolling et al. | |
| 5,920,848 A | 7/1999 | Schutzer et al. | |
| 5,956,489 A | 9/1999 | San Andres et al. | |
| 5,956,700 A * | 9/1999 | Landry | G06Q 20/04 705/39 |
| 5,970,475 A | 10/1999 | Barnes et al. | |
| 5,978,780 A * | 11/1999 | Watson | G06Q 20/10 705/38 |
| 5,983,208 A | 11/1999 | Haller et al. | |
| 5,991,733 A | 11/1999 | Aleia et al. | |
| 6,032,133 A | 2/2000 | Hilt et al. | |
| 6,064,988 A | 5/2000 | Thomas | |
| 6,070,150 A * | 5/2000 | Remington | G06Q 20/04 705/34 |
| 6,070,177 A | 5/2000 | Kao et al. | |
| 6,078,907 A | 6/2000 | Lamm | |
| 6,081,789 A | 6/2000 | Purcell et al. | |
| 6,098,052 A | 8/2000 | Kosiba et al. | |
| 6,163,272 A | 12/2000 | Goode | |
| 6,188,994 B1 | 2/2001 | Egendorf | |
| 6,208,345 B1 | 3/2001 | Sheard et al. | |
| 6,275,819 B1 | 8/2001 | Carter | |
| 6,289,322 B1 | 9/2001 | Kitchen et al. | |
| 6,298,335 B1 * | 10/2001 | Bernstein | G06Q 20/04 705/34 |
| 6,324,524 B1 | 11/2001 | Lent et al. | |
| 6,330,551 B1 | 12/2001 | Burchetta et al. | |
| 6,389,471 B1 | 5/2002 | Agraharam et al. | |
| 6,513,018 B1 | 1/2003 | Culhane | |
| 6,532,450 B1 | 3/2003 | Brown et al. | |
| 6,629,081 B1 * | 9/2003 | Cornelius | G06Q 20/04 705/30 |
| 6,823,319 B1 * | 11/2004 | Lynch | G06Q 20/10 705/38 |
| 6,850,918 B1 | 2/2005 | Burchetta et al. | |
| 6,868,391 B1 | 3/2005 | Hultgren | |
| 6,886,000 B1 | 4/2005 | Aggarwal et al. | |
| 6,954,741 B1 | 10/2005 | Burchetta et al. | |
| 6,999,943 B1 | 2/2006 | Johnson et al. | |
| 7,006,994 B1 | 2/2006 | Campbell et al. | |
| 7,069,234 B1 * | 6/2006 | Cornelius | G06Q 20/10 705/26.35 |
| 7,076,444 B1 | 7/2006 | Baron et al. | |
| 7,076,462 B1 | 7/2006 | Nelson et al. | |
| 7,130,853 B2 | 10/2006 | Roller et al. | |
| 7,167,839 B1 | 1/2007 | Layne | |
| 7,191,150 B1 | 3/2007 | Shao et al. | |
| 7,249,114 B2 | 7/2007 | Burchetta et al. | |
| 7,318,046 B1 * | 1/2008 | Wellons | G06Q 30/06 705/38 |
| 7,366,696 B1 * | 4/2008 | Ganesan | G06Q 20/10 705/35 |
| 7,386,102 B2 | 6/2008 | Summe et al. | |
| 7,401,050 B2 | 7/2008 | O'Neill | |
| 7,467,109 B1 | 12/2008 | Simon et al. | |
| 7,536,336 B1 | 5/2009 | Guinan | |
| 7,542,921 B1 | 6/2009 | Hildreth | |
| 7,559,217 B2 | 7/2009 | Bass | |
| 7,584,146 B1 | 9/2009 | Duhon | |
| 7,680,728 B2 | 3/2010 | Lazerson | |
| 7,685,067 B1 * | 3/2010 | Britto | G06Q 20/10 235/379 |
| 7,814,005 B2 | 10/2010 | Imrey et al. | |
| 7,818,229 B2 | 10/2010 | Imrey et al. | |
| 7,848,978 B2 | 12/2010 | Imrey et al. | |
| 7,970,702 B1 | 6/2011 | Hinchcliff et al. | |
| 2001/0011245 A1 | 8/2001 | Duhon | |
| 2001/0037204 A1 | 11/2001 | Horn et al. | |
| 2001/0039523 A1 | 11/2001 | Iwamoto | |
| 2001/0044772 A1 | 11/2001 | Allen et al. | |
| 2002/0038292 A1 | 3/2002 | Quelene | |
| 2002/0042773 A1 | 4/2002 | Fugitte et al. | |
| 2002/0046065 A1 | 4/2002 | Nighan | |
| 2002/0059139 A1 | 5/2002 | Evans | |
| 2002/0069108 A1 | 6/2002 | Aubertin et al. | |
| 2002/0069182 A1 | 6/2002 | Dwyer | |
| 2002/0077964 A1 | 6/2002 | Brody et al. | |
| 2002/0123946 A1 | 9/2002 | Haworth et al. | |
| 2002/0128960 A1 | 9/2002 | Lambiotte et al. | |
| 2002/0138409 A1 | 9/2002 | Bass | |
| 2002/0161699 A1 | 10/2002 | Okamoto et al. | |
| 2002/0198753 A1 | 12/2002 | Feldman et al. | |
| 2002/0198796 A1 | 12/2002 | White et al. | |
| 2003/0009418 A1 | 1/2003 | Green et al. | |
| 2003/0018574 A1 | 1/2003 | Shumway | |
| 2003/0028782 A1 | 2/2003 | Grundfest | |
| 2003/0046223 A1 | 3/2003 | Crawford et al. | |
| 2003/0050929 A1 | 3/2003 | Bookman et al. | |
| 2003/0055783 A1 | 3/2003 | Cataline et al. | |
| 2003/0074290 A1 | 4/2003 | Clore | |
| 2003/0078881 A1 | 4/2003 | Elliott et al. | |
| 2003/0083917 A1 | 5/2003 | Tracey et al. | |
| 2003/0083984 A1 | 5/2003 | Crawford et al. | |
| 2003/0084428 A1 | 5/2003 | Agostini et al. | |
| 2003/0110129 A1 | 6/2003 | Frazier et al. | |
| 2003/0187796 A1 | 10/2003 | Swift et al. | |
| 2003/0212630 A1 | 11/2003 | Kahr | |
| 2003/0229580 A1 | 12/2003 | Gass et al. | |

(56) References Cited

U.S. PATENT DOCUMENTS

| | | |
|---|---|---|
| 2003/0233292 A1 | 12/2003 | Richey et al. |
| 2004/0015425 A1 | 1/2004 | O'Neill |
| 2004/0019560 A1 | 1/2004 | Evans et al. |
| 2004/0039687 A1 | 2/2004 | Lent et al. |
| 2004/0059671 A1 | 3/2004 | Nozaki et al. |
| 2004/0059674 A1 | 3/2004 | Hatano |
| 2004/0073509 A1 | 4/2004 | Haddad |
| 2004/0078243 A1 | 4/2004 | Fisher |
| 2004/0111359 A1 | 6/2004 | Hudock |
| 2004/0133513 A1 | 7/2004 | McCoy et al. |
| 2004/0133514 A1 | 7/2004 | Zielke et al. |
| 2004/0199456 A1 | 10/2004 | Flint et al. |
| 2004/0226995 A1 | 11/2004 | Smith |
| 2004/0243508 A1 | 12/2004 | Samson et al. |
| 2005/0004870 A1 | 1/2005 | McGaughey |
| 2005/0010537 A1 | 1/2005 | Ettinger, Jr. |
| 2005/0080723 A1 | 4/2005 | Burchetta et al. |
| 2005/0080821 A1 | 4/2005 | Breil et al. |
| 2005/0165797 A1 | 7/2005 | Nair |
| 2005/0182713 A1 | 8/2005 | Marchesi |
| 2005/0203785 A1 | 9/2005 | Kixmiller |
| 2006/0031158 A1 | 2/2006 | Orman |
| 2006/0053083 A1 | 3/2006 | Wiest et al. |
| 2006/0062375 A1 | 3/2006 | Pasquale et al. |
| 2006/0080186 A1 | 4/2006 | Burchetta et al. |
| 2006/0080233 A1 | 4/2006 | Mendelovich et al. |
| 2006/0085331 A1 | 4/2006 | Imrey et al. |
| 2006/0085332 A1 | 4/2006 | Imrey et al. |
| 2006/0085334 A1 | 4/2006 | Murphy |
| 2006/0106717 A1 | 5/2006 | Randle |
| 2006/0247991 A1 | 11/2006 | Jin et al. |
| 2007/0005498 A1 | 1/2007 | Cataline et al. |
| 2007/0022118 A1 | 1/2007 | Layne |
| 2007/0033139 A1 | 2/2007 | Handler |
| 2007/0073612 A1 | 3/2007 | Smith et al. |
| 2007/0098146 A1 | 5/2007 | Rice |
| 2007/0106573 A1 | 5/2007 | Burchetta et al. |
| 2007/0106621 A1 | 5/2007 | Burchetta et al. |
| 2007/0118486 A1 | 5/2007 | Burchetta et al. |
| 2007/0150377 A1 | 6/2007 | Burchetta et al. |
| 2007/0203756 A1 | 8/2007 | Sears et al. |
| 2007/0299771 A1 | 12/2007 | Brody et al. |
| 2008/0065557 A1 | 3/2008 | Burchetta et al. |
| 2008/0065558 A1 | 3/2008 | Burchetta et al. |
| 2008/0114679 A1 | 5/2008 | Burchetta et al. |
| 2008/0126254 A1 | 5/2008 | Burchetta et al. |
| 2008/0126266 A1 | 5/2008 | Burchetta et al. |
| 2008/0140582 A1 | 6/2008 | Burchetta et al. |
| 2008/0215439 A1 | 9/2008 | Reynolds |
| 2009/0177576 A1 | 7/2009 | Cugliari |
| 2009/0248481 A1 | 10/2009 | Dick et al. |
| 2011/0071946 A1 | 3/2011 | Handler |
| 2011/0119169 A1 | 5/2011 | Passero et al. |
| 2011/0178860 A1 | 7/2011 | Imrey et al. |
| 2011/0178934 A1 | 7/2011 | Imrey et al. |
| 2012/0209760 A1 | 8/2012 | McCarthy et al. |

FOREIGN PATENT DOCUMENTS

| | | |
|---|---|---|
| JP | 2002-049755 | 2/2002 |
| JP | 2002-073983 | 3/2002 |
| JP | 2002-109358 | 4/2002 |
| JP | 2002-117061 | 4/2002 |
| JP | 2002-117227 | 4/2002 |
| JP | 2002-230350 | 8/2002 |
| JP | 2002-351962 | 12/2012 |
| KR | 2003 0026693 | 4/2003 |
| WO | WO 00/72241 | 11/2000 |
| WO | WO 01/46830 | 6/2001 |
| WO | WO 01/55891 | 8/2001 |
| WO | WO 2004/029850 | 4/2004 |

OTHER PUBLICATIONS

Makuch, William M. et al "Managing Consumer Credit Delinquency in the US Economy: A Multi-Billion Dollar Management Science Application" *Interfaces* Jan./Feb. 1992 22:90-109.

Credit Bureaus; Encyclopedia of Small Business, 2nd ed., (2002).

"AMS and Dozier Form Alliance to Deliver Total Debt Recovery Solution" *Highbeam Business Article*, PR Newswire, Oct. 27, 1997.

"Microlog Introduces 'The Automated Collector' for the Collections Market" *Highbeam Business Article*, PR Newswire, Oct. 27, 1997.

Griffin, Kate, "What the Internet Means for Collections," *Highbeam Business Article*, Credit Cart Management, Apr. 1, 1998.

"IMA and PaylinX Announce Product Integration and Co-Marketing Agreement", *Highbeam Business Article*, PR Newswire, Sep. 2, 1998.

International Search Report dated Oct. 12, 2012 issued in corresponding/related PCT application (No. PCT/US2012/047821).

Written Opinion dated Oct. 12, 2012 issued in corresponding/related PCT application (No. PCT/US2012/047821).

"Credit Scores, CNNfn", Aug. 12, 2004, Finance Wire.

Andreozzi, William G. "Using the installment method with escrow arrangements" *The Tax Adviser*, May 2000 31(5), 340-343. Retrieved Aug. 10, 2010.

"The ABC's of Debt Collection", www.abccompanies.com/collections/index, The ABC Companies, Inc., obtained from http://web.archive.org/web>, (1998), 3 p.

"Blenheim debt agency first on Net with credit checking; New Zealand: New Internet Service by Creditmens", *NZInfoTech Weekly*, Obtained from Dialog, Acession No. 06695396, (Sep. 28, 1998), 1 p.

Burnham, Bill "The electronic commerce report" 1997 pp. 1-8; Nov. 12, 1997.

Cleaver, Joanne "Collections calls go high-tech: many issuers are backing off from a shotgun approach to collections calls and are focusing resources on accounts with the highest projected returns. (Collections & Recovery)." *Highbeam Business, Article from: Credit Card Management* (Jul. 1, 2002).

Whiteside et al, "Annual Reprt The Masters of Change" Collections & Credit Risk Magazine, May 1996, pp. 34-38, 40-42 and 44-46.

"Collections in Cyberspace" from Collection & Credit Risk Magazine Sep. 1997 pp. 21.

Grunewald, R. "Banking from home" The Region, Jun. 1995 issue, pp. 1-8.

Kerridge, Ronald D. Tax-Exempt Credit Counseling Organizations and the Future services; Texas Review fo Law & Politics 14.2 (Spring 2010).

Maynes, Todd F. Distressed Debt in Disorderly and Dysfunctional markets; Taxes 87.3 (Mar. 2009: 55-74+.

McCawley, Harry B: Proposed Regulations for debt instruments calling for debt instruments calling for one or more continuos analysis—Part2: Tax Management Memorendum 36.19 (Sep. 18, 1995):267.

Users Guide for Periphonics PeriWeb (Software Release 5.3.1/4.6.0), rev. 2.2, Jan. 15, 1998.

"Periphonics Debuts Software for Internet Transaction Processing", National Underwriter / Property & Casualty Risk & Benefits Management, Oct. 12, 1998, vol. 102 Issue 41, p. 28, 1/9p.

\* cited by examiner

New Debtor Profile

Debtor:
Address1:
Address2:
City:
State:     Zip code:
Phone:
Email:
Social Security:
DUNS:
Date of Birth:
Employment:
Employment Address:
Work phone:
Type: STD   Status: Standard Debtor Profile
Comments:

Submit   Reset   Main Menu

FIG. 9

New Creditor Profile

Organization: _____ 214
Contact Name: _____ 215
Address1: _216
Address2: _____ 217
City: _ 219
State: _220
Zip code: __ 221
Phone: __ 222
Fax: ____ 223
Email: ____ 224
URL (web address): ____
Description: [◀ ▶] 225

[Submit] 226  [Reset] 227  [Main Menu] 228

JOE COLLECTION AGENCY
1 Creditor Way, Not So Pleasant, State 4U 44444

Mr. Peter Powell
145 W. 18 Ave. 24
Longmont, CO 80501

RE: YOUR DEBT

Dear Peter:

You should pay now or you will not be a happy or responsible person.

THIS IS AN ATTEMPT TO COLLECT A DEBT AND ANY INFORMATION OBTAINED WILL BE USED FOR THAT PURPOSE

NOTICE- SEE REVERSE SIDE FOR IMPORTANT INFORMATION

Sincerely,

Joe Agency

NOTICE: New Customer Service and Payment Option!!
You can now complete your customer service or payment transaction via the internet at www.solvemydebt.com the secure and confidential communication alternative to the phone or mail. Your confidential site access code for Account VRG-000001 is: BUBBA1

---

JOE AGENCY                           PAY THIS AMOUNT:
P.O. BOX 12345
ENHANCED CSTMR SRVCE WAY             $BESTVALUE
MORE PROFITS, 4U

SYSTEM AND METHOD FOR DEBT PRESENTMENT AND RESOLUTION

This application is a continuation application of published application Ser. No. 13/282,834, filed Oct. 27, 2011, which is a continuation application of published application Ser. No. 13/010,744, filed Jan. 20, 2011, which is a continuation application of published application Ser. No. 10/329,302, filed Dec. 23, 2002, which is a continuation-in-part application of published application Ser. No. 09/267,840 filed Mar. 12, 1999. The present invention relates broadly to a system and method whereby a person owing a debt or bill is invited to resolve this indebtedness via the Internet. More specifically, the user is invited (by traditional media such as phone or mail) to visit a "transaction community" wherein the debt may be resolved through an interactive exchange of information.

BACKGROUND OF THE INVENTION

The present invention relates to an Internet-based financial service that, unlike current systems, may be accessed by anyone with a personal computer having an Internet connection. This disclosed system exceeds current standards for online banking (Open Financial Exchange) and is set to meet or exceed anticipated revisions. In a typical debt resolution application of the disclosed system, the credit or collection company customer (the debtor) can participate in web-based financial transactions without previously establishing a personal online banking system. Initially, the credit or collection organization invites the debtor to utilize applicant's web-based customer service software by offering Internet payment as an option to traditional payment methods such as mail or telephonic credit card transactions. For example, the mailed copy of a "past due" notice invites the debtor to visit the creditor's web-based "transaction community"—an interactive alternative location for debt resolution.

The WorldWide Web, or Internet, is actually a complex "web" of smaller regional networks. It is comparable in many ways to our roadways. A network of interstate superhighways connect large cities. These highways flow into smaller freeways and parkways linking smaller towns to the big cities. The parkways ultimately connect to slower, narrower residential streets. See EFF's Extended Guide to the Internet, incorporated herein by reference.

In the world of computers, the "superhighway" is the high-speed Internet. Connected to the Internet are computers that use a particular system of transferring data at high speeds. In the United States, the major Internet "backbone" theoretically can move data at rates of 45 million bits per second. By way of comparison, the average home modem has a top speed of roughly 14,400 to 56,000 bits per second. This inter-Internetworking "protocol" allows a network user to connect and link up with computers around the world.

Smaller networks serving particular geographic regions are connected to the backbone computers, which generally move data at speeds around 1.5 million bits per second. These networks are hooked to even smaller networks and individual computers. Unlike commercial networks, a central computer does not run the Internet. This is both its greatest strength and its greatest weakness. This approach means it is virtually impossible for the entire Internet to crash at once—even if one computer shuts down, the rest of the network stays up. This design also reduces the costs associated with an individual or organization accessing the Internet through a network. However, thousands of connected computers can also make it difficult to navigate the Internet and find what you want—especially as different computers may have different commands for "plumbing" or accessing their resources. Only recently have Internet users begun to develop the navigational tools and "maps" that allow neophytes and relatively inexperienced users get around and navigate the Internet without getting lost.

The number of users, computers, and networks making up this Internet is not known with any degree of certainty. Some estimates place as many as 5,000 networks, connecting nearly 2 million computers and more than 15 million people around the world as the Internet. Whatever the actual numbers, they are increasing rapidly.

The Internet is more than just a technological marvel. It is a revolutionary means of communication. The rate at which information and documents are exchanged is obviously quite a bit faster than mail, as messages race around the globe in seconds, provided you have the right connection. Network providers are therefore continually working on ways to facilitate communication between users of one network with those of another. At present, work is underway on a universal "white pages" in which you could look up somebody's electronic-mail address. This "connectivity" will become even more important in coming years as users begin to demand "seamless" network access, much as a telephone user can dial almost anywhere in the world without thinking about the number of phone companies actually involved with the call. As it becomes easier to use, more and more people will undoubtedly join this worldwide community known as the Internet.

While the present invention will have broad application to the full range of online financial transactions, particular applicability is seen in the area of credit and collection practices. The credit and collection arenas are segmented into distinct market niches. The first niche comprises, for instance, collection organizations. The collection industry is further defined by type of debts collected (consumer vs. commercial) and then by the placement of various debts by and within the various industries.

Credit transactions (e.g., loans, credit cards, etc.) provide an additional immediate niche for the invention as disclosed. The "transaction community" of the present invention allows for customization to address the various transaction niches required within the various credit and collection communities. In other words, the invention may be adapted to handle almost any credit or collection transaction.

The debt collection industry is consolidating. The May 1996 issue of Collection & Credit Risk Magazines Annual Report notes that: "[a]lready the number of collection agencies has fallen by some 20% in the past two decades." Additionally, mergers-and-acquisitions specialist M. Kaulkin and Associates, of Bethesda, Md., reports that industry insiders expect another 15% to 20% decrease and further consolidation: "[t]he signs of an ongoing consolidation in the collections industry are unmistakable. In fact, as measured by placements, the 10 largest agencies in the country have increased their market share from about 15% in 1992 to 42.1% last year."

Over the years, debt collection has evolved as a function of available technology and its utilization. There was a time when a collection agent would personally visit the debtor for debt resolution. Mail allowed the creditor and debtor to communicate through a series of "dunning" letters to prompt debt resolution. With the advent of the telephone, the creditor and debtor were able to facilitate debt resolution. Of course, while far less costly than personal visits, mail and phone collections are expensive operations, lowering the profitability of the debt collection process.

Computers have long been used in debt collections, initially with respect to the maintenance of debtor records through database consolidation and utilization. More recently, advances include computer telephony and predictive dialers, which have increased efficiency and lowered time, energy, and cost expended in debt collection via the telephone. The present invention is a leap forward in the use of technology in the debt collection industry. In applicant's system, the creditor invites and encourages the debtor to communicate and resolve debts on the personal computer over the Internet. It should be noted that all previous technological advances in this field have been used to increase creditor yield while reducing expenses. Times have changed. Increased competition for consumer dollars has changed the creditor/debtor relationship into a customer service relationship. Creditors now compete to retain and attract customers by offering customer service. The present invention accelerates this trend by allowing credit or collection organizations to offer competitive customer service while also increasing yield and decreasing expenses by providing a method that gives customers the ability to resolve debt through a web-based "transaction community".

Not surprisingly, there are a number of prior references that teach various methods of bill payment and management.

For example, U.S. Pat. No. 5,220,501, issued to Lawlor, et al., discloses a system and method for the remote distribution of financial services (e.g., home banking and bill-paying) which includes providing a portable computer terminal to a user. The terminal may include a multi-line display, keys "pointer to" lines on the display, and additional function keys. The terminal establishes contact between a central computer that is operated by a service provider, preferably over an analog telephone line, and a packeted data network software bundle. Information is exchanged between the central computer and a terminal that solicits particular information from the user relating to requested financial services. For example, to pay a bill the payee approves the amount and provides his bank account PIN (personal identification number). The central computer would then transmit a response message over a conventional electronic Automatic Teller Machine ("ATM") network for debiting the user's bank account in real time, and then electronically remitting payment to the specified payees in the specified amounts. Additionally, payment(s) and/or transfer(s) may be further scheduled in advance or on a periodic basis. Because the central or main computer interacts with the user's bank as a standard point of sale ("POS") or ATM network node, no significant software changes are required at the bank's computers. The terminal interface tries to be user-friendly in incorporating some of the features of standard ATMs.

U.S. Pat. No. 5,383,113, issued to Kight, et al., discloses a computerized payment system by which a consumer may instruct a service provider via telephone, computer, or other telecommunications means to pay various bills without the consumer having to write individual checks for each bill. The system essentially operates without restriction as to where the consumer banks and what bills are to be paid. Essentially, the service provider collects consumer information, financial institution information and merchant information and arranges payment according to the consumer's instructions.

U.S. Pat. No. 5,465,206, issued to Hilt, et al., discloses a bill pay system wherein participating consumers may pay bills to participating creditors through a payment network. The participating consumers receive bills from participating creditors (paper bills, e-mail, implied bills from automatic debts) which indicate an amount and biller identification number. To authorize a remittance, a consumer transmits to a participating bank a payment notice that indicates a payment date, an amount, the debtor's account, the source from which the funds are to be remitted and the biller's identification number. A bank then submits a payment "message" to the subscribed payment network and forwards the payment message to the biller's bank. For settlement, the debtor's bank debits the consumer's account and likewise, the creditor's bank receives a Internet position from the payment network and credits the creditor's bank account. If the debtors's bank agrees to send a non-reversible payment message, then the debtor's bank does not submit the transaction until funds are good unless the consumer's bank is willing to take the risk of loss as would be in the case in a guaranteed payment network. In specific embodiments, the consumer initiates the bill pay orders manually, via paper at an ATM, via PC, or via telephone keypad.

U.S. Pat. No. 5,483,445, issued to Pickering, discloses an automated system and method for consolidating a plurality of individual company charges for a customer with different periodic company billing and payment due dates. Under the system, companies and businesses such as utility companies would report periodic billing information to a central processing facility. This transfer is completed by electronic or magnetic data transfer. The processing office undergoes minimal processing and "holds" the billing information data until all of the billing information is received. Then, the central facility generates a single customer statement which identifies individual company charges and the statement due date. The statement is then sent to the customer with payment for the charges by the due date. After receiving payment from the customer, the system processes the payment and remits payment to the companies.

U.S. Pat. No. 5,504,677, issued to Pollin, discloses a system and method of collecting payments using an automated system to generate a draft, payable to the creditor and drawn on the payor's checking account, pursuant to payor's authorization. The draft is executed by the debt collector as authorized signatory for the payor, and deposited into the payee's account. The automated system has a simple input screen that receives the necessary information for generation of the draft, which may be read to the system operator over the telephone by the authorizing payor. The system verifies the account information, comparing the input information to records in a database associated with the system. Optionally, the system may also generate an "inquiry" to the bank to determine the funds availability. When verification is complete, the system generates a paper draft payable to the payor, which may use an MICR ink so that the draft can be processed in the banking system like an ordinary check. The signature block would then be made for the collection agent "as authorized signatory for" the payor.

U.S. Pat. No. 5,621,640, issued to Burke, discloses an automatic donation system for a sales establishment including an entry arrangement for entering the price of a product into a cash register, the amount of cash being paid and a calculator for determining excess cash payment(s). A card reader keypad receives a card(s) number for accessing data and then prints out the amounts entered.

U.S. Pat. No. 5,623,662, issued to McIntosh, discloses a method and system for extracting revenue information from a point-of-sale (POS) terminal for purposes of revenue sharing that includes the steps of periodically selecting and extracting predetermined portions of data from a proprietary database. This system allows for extrapolation of select data relating to revenue traffic in a rental system. Revenue stored in a proprietary database by a proprietary POS operating program is periodically selected, extracted and stored in a periodic database. The proprietary POS operating program can be used to create a history report database from the revenue transaction data and the portions of the revenue transaction data can be selected and extracted from the history report database.

U.S. Pat. No. 5,644,727, issued to Atkins, discloses a communication and computer based system for effecting exchange, investment and borrowing, involving the use of digital communication and computation terminals distributed to users and service providers. Through the system described and its combined computer and communication terminals, client/customers may purchase goods and services, save, invest, track bonuses and rebates and effect enhanced personal financial analysis, planning, management and record keeping with less effort and increased convenience. Through a prioritization function, the client specifies her financial objectives, her risk preference, and budgetary constraints. The prioritization function automatically suggests to the individual a portfolio of asset and liability accounts that may be credited and/or debited to provide the required funds for consumption and to form investments and borrowing to best realize the financial objectives. If desired, the system automatically manages a client's budgetary and financial affairs through a system of expert sweeps based on a client's preferences. The client's accounts are monitored via a borrowing power baseline, and considered imbalanced if the client's borrowing power is less than the minimum borrowing power. If the account is imbalanced, the client may then reallocate the assets and liabilities within the client account and/or modify a set of constraints on the client account. If the client account is still not balanced after modification of the account, the system will deny authorization for certain requested transactions, and may initiate the liquidation of certain asset accounts and reduce the balances of one or more liability accounts.

U.S. Pat. No. 5,649,117, issued to Landry, discloses a system and method for paying bills without requiring interaction with the payors. The system includes a payor control interface, a communications interface, a bill generator, and a TCF message generator. The bill generator generates bill records from the payor and payee information and from bill data messages received from payees. The generated records are used by the TCF message generator to generate the EFT messages for transferring funds electronically between payors and payees. Payors may alter the payment amount and date for a bill as well as reverse payment of a bill already paid. Payees are also able to alter recurring bill records or may present bill data so that bill records reflecting variable obligation amounts may be generated.

U.S. Pat. No. 5,652,786, issued to Rogers, discloses a method and apparatus for processing payment transactions using debit card numbers without the requirement of a personal identification number (PIN). A telepay system of the present invention provides an interface between a standard touch-tone telephone and at least one debit card network such that real-time bill payment transactions may be effected using a keypad of the telephone. The telepay system includes an interactive voice response unit for prompting a payor to enter an access code, account number, debit card number and payment amount and for informing the user of the status of the transaction. Real-time processing of transactions is provided through use of debit card networks, rather than the Automated Clearing House. The telepay system is also capable of performing settlement functions and processing inquiries by payees of the system regarding previously processed transactions.

U.S. Pat. No. 5,655,008, issued to Futch, et al., discloses a system and method whereby a multiplicity of users may perform a variety of transactions, such as a product/service request, a bill payment request and long distance telephone service, through a system operator. The system includes a plurality of telephone instruments respectively having a telephone identifier and a wallet card swipe reader or the like for inputting a user identifier. A plurality of user actuators, such as individual buttons, are located on the telephone instrument to initiate a request for a particular transaction. A system processor in communication with the telephone instrument determines which type of transaction is being requested and determines whether the request is valid. Preferably, the validity check is completely performed at a computer having a validity table in its memory corresponding to the particular telephone instrument. The computer stores all transaction requests accrued over a period of time in its memory and forwards them to a central computer at a predetermined regular time. The central computer then correlates the transaction request with complete information in its database to carry out the transaction as requested.

U.S. Pat. No. 5,655,089, issued to Bucci, discloses that analysis has revealed that there is an undue proliferation of first-class mail being sent each month in the nature of bills, statements and similar such documents. Analysis has also revealed that this produces an unnecessary expense for postage and processing, besides the costs involved in purchasing the paper and envelopes to begin with. The method of the invention avoids this through the single mailing of one or more two-sided documents on which is presented all the bills, statements, etc., intended for a given recipient during a specified period of time, for all subscribers to the service. In accordance with the described embodiment of the invention, the method forms a computer database of addressee information; merges with that database all such record information provided by subscribers; prints out one or more sheets, preferably on both sides, of all information intended for designated recipients during the time period in question; and allows for a single mailing of such sheets in a single envelope.

U.S. Pat. No. 5,684,965, issued to Pickering, discloses an automated method and system for consolidating a plurality of individual company charges for a customer with different periodic company billing and payment due dates. Under the system, companies and businesses such as utility companies report their periodic billing information to a central processing office or facility. The processing office holds the billing information data until all of the billing information for the customer during a pre-selected time period is received. Then, the central processing facility generates a single customer statement which identifies all individual company charges as well as a statement due date. The statement is sent to the customer and payment for the charges due. After receiving payment from the customer, the centralized billing center processes the payment and then remits payment to all of the companies.

U.S. Pat. No. 5,696,906, issued to Peters, et al., discloses an integrated computerized system and method of telecommunication user account management. The invention creates, maintains, processes and analyzes data regarding individual users for telecommunication services. Billing for individual users is generated. The user data is analyzed and reports for all or part of the user data are prepared and generated. Ancillary functions are enabled, including word processing, editing, e-mail, and other functions. The invention is applicable to subscriber telecommunication services, and pay-for-use services, and the user may be a subscriber or a non-subscriber. The invention is applicable to multi- or single-channel telecommunication services. Such telecommunication services may include cable television, telephone, video, audio, on-line databases, television, radio, music video, video juke box, pay-for-view, video-on-demand, interactive TV, home-shopping, video conferences, telephone conferences, interfacing to imaging systems, and automatic telephone call charge-backs ("900" numbers). The current preferred embodiment of the invention is for cable television services subscriber account management.

U.S. Pat. No. 5,699,528, issued to Hogan, discloses a bill delivery payment system in which users are able to access a server computer on a communications network to obtain bill information and pay bills. For example, such a communications network may be the Internet. Using a personal computer, a user can access a Web site provided by the server computer to view the bill information and instruct the server computer as to the details of the bill payment. In a second embodiment, without visiting the web site, users are provided with electronic bills containing bill information in the form of electronic mail (e-mail) at their e-mail addresses. After opening an electronic bill, a user can make the bill payment by replying to the electronic bill.

U.S. Pat. No. 5,710,887, issued to Chelliah, et al., discloses a system for facilitating commercial transactions, between a plurality of customers and at least one supplier of items over a computer driven network capable of providing communications between the supplier and at least one customer site associated with each customer. Each site includes an associated display and an input device through which the customer can input information into the system. At least one supplier is presented on the display for selection by the customer using the input device. Similarly items from a supplier can be displayed for the customer to observe. In addition, a customer information database stores information relating to the customer. Associated with each customer is a customer monitoring object for each customer. The customer monitoring object is created by referencing information, relating to that customer, which had been stored in the customer information database and when the customer selects a supplier. The customer monitoring object is configured to operate by responding to customer inquiries regarding a presented item by retrieving information relating to the item and presenting the information to the customer; receiving a customer's selection of a presented item; receiving customer communications, indicating a desire to receive the item; and passing a communication to initiate the delivery of the item to the customer.

U.S. Pat. No. 5,715,298, issued to Rogers, discloses processing payment transactions using debit card numbers without the requirement of a personal identification number (PIN). A telepay system provides an interface between a standard touch-tone telephone and at least one debit card network such that real-time bill payment transactions may be effected using a keypad of the telephone. The telepay system includes an interactive voice response unit for prompting a payor to enter an access code, account number, debit card number and payment amount and for informing the user of the status of the transaction. Real-time processing of transactions is provided through use of debit card networks, rather than the Automated Clearing House. The telepay system is also capable of performing settlement functions and processing inquiries by payees of the system regarding previously processed transactions.

U.S. Pat. No. 5,715,399, issued to Bezos, discloses a system for securely indicating to a customer one or more credit card numbers that a merchant has on file for the customer when communicating with the customer over a non-secure network. The merchant sends a message to the customer that contains only a portion of each of the credit card numbers that are on file with the merchant. Then a computer retrieves the credit card numbers by reference on file for the customer in a database, constructs the message, and transmits the message to a customer location (10) over the Internet network (30) or other non-secure network. The customer can then confirm in a return message that a specific one of the credit card numbers on file with the merchant should be used in charging a transaction. Since only a portion of the credit card number(s) are included in any message transmitted, a third party cannot discover the customer's complete credit card number(s).

U.S. Pat. No. 5,724,512, issued to Dedrick, discloses a method for providing electronic advertisements to end users in a consumer best-fit pricing manner including an index database, a user profile database, and a consumer scale matching process. The index database provides storage space for the titles of electronic advertisements. The user profile database provides storage for a set of characteristics that correspond to individual end users of the apparatus. The consumer scale matching process is coupled to the content database and the user profile database and compares the characteristics of the individual end users with a consumer scale associated with the electronic advertisement. The apparatus then charges a fee to the advertiser, based on the comparison by the matching process. In one embodiment, a consumer scale is generated for each of multiple electronic advertisements. These advertisements are then transferred to multiple yellow page servers, and the titles associated with the advertisements are subsequently transferred to multiple metering servers. At the metering servers, a determination is made as to where the characteristics of the end users served by each of the metering servers fall on the consumer scale. The higher the characteristics of the end users served by a particular metering server fall, the higher the fee charged to the advertiser.

U.S. Pat. No. 5,724,584, issued to Peters, et al., discloses a system for processing a batch which is distributed into a plurality of independent segments. A preferred embodiment of this invention calls for implementation on a symmetrical multiprocessing platform, however, the invention is also applicable to massively parallel architectures as well as uniprocessor environments. Each segment comprises a plurality of discrete events, each discrete event comprising a plurality of sub-events to be processed. The system operates to process each discrete event within each segment sequentially and each sub-event within each discrete event sequentially. The plurality of segments may be processed on an uniprocessor, an SMP system or an MPP system. By balancing the number of discrete events in each segment using a "coarse grain" approach, a flexible but efficient use of processor availability is obtained.

U.S. Pat. No. 5,727,249, issued to Pollin, discloses a system and method of collecting payments comprising an automated system to generate a draft, payable to the creditor and drawn on the payor's checking account, pursuant to the payor's authorization. The draft is then executed by the debt collector as authorized signatory for the payor, and deposited into the payee's account to complete payment. The automated system has a simple input screen that receives the necessary information for generation of the draft, which may be read to the system operator over the telephone by the authorizing payor. The system verifies the bank and account information by comparing the input information to records in a database associated with the system. Optionally, the system may also generate an inquiry to the bank to determine the availability of funds in the payor's account. When verification is complete, the system generates a paper bank draft payable to the payor, using MICR ink so that the draft can be processed in the banking system like an ordinary check. The signature block of the draft is made for the collection agent "as authorized signatory for" the payor.

U.S. Pat. No. 5,729,594, issued to Klingman, discloses a remote communication system for facilitating secure electronic purchases of goods on-line, wherein a suitable local user input device in association with a data transmission system couples the user input into a packet network system for communication to a remote receiver/decoder apparatus to try a potentially desired product. Upon selection of the desired product by the user, a telecom network link is used to communicate a telephone number associated with the desired product from the user to the remote receiver to allow the user to buy the desired product. The telecom network used to link the user input device to the remote apparatus may also include a 900 number billing system for assessing and collecting fees for use of the system.

U.S. Pat. No. 5,734,828, issued to Pendse, et al., discloses an on-line/information service system which is constituted with a caller management server and a number of on-line/information servers. The caller management server is equipped with multiple ports and complementary hardware/software, including a call management application, for managing multiple concurrent calls, which includes optionally validating the calls depending on whether services are provided on a callee or caller basis, assigning and connecting the calls to corresponding on-line/information service delivery environments on the on-line/information servers. The on-line/information servers are equipped with adequate hardware/software, including an on-line/information service manager application and a number of on-line/information service applications, to support multiple on-line/information service delivery environments. Each on-line/information service delivery environment is equipped with streamlined application sharing host services, thereby allowing an end-user PC equipped with streamlined application sharing client services to access on-line/information services provided by the on-line/information service applications.

U.S. Pat. No. 5,737,414, issued to Walker, et al., discloses a billing and collection system for enabling payment for a service provided over a data network by billing a customer for a telephone connection to a shared revenue billing network where the telephone connection to the billing network regulates access to the service provided over the data network, comprising: a data network including at least one user on-line service provider presenting at least one service for on-line access by a user with a user computer through the data network, a billing network and an access management computer for controlling access to the on-line service provider and billing the user for access to the on-line service provider, the access management computer communicating with the data network for enabling and terminating access to the on-line service provider through the user computer whereby the billing Network shares revenues for the telephone connection with the on-line service provider.

U.S. Pat. No. 5,739,512, issued to Tognazinni, discloses that digital delivery of receipts overcomes many of the problems associated with paper receipts. Digital receipts can be delivered over a proprietary or over an open Network such as the Internet. They can be uploaded to a smart card. They can be standardized in format to facilitate automated processing. An e-mail address can also be incorporated into a bank card or other machine readable and for automatic routing of the receipt to a payor's e-mailbox.

It is clear that these prior references do not teach or suggest the present invention, which invites the consumer to visit an interactive "transaction community" that provides the consumer with an interesting, creative alternative to traditional methods of debt presentment and resolution.

SUMMARY OF THE INVENTION

The present debt presentment and resolution system utilizes an Internet system featuring the distributed network of administrative and consumer users on, for example, Microsoft Windows 32-bit operating systems connecting legacy systems and providing secure access to a robust SQL database structure delivering innovative benefits and advantages in customer service and payment options for consumers. Billing service companies whose services extend via the mail and electronic bill presentment and payment do not offer a connected system that integrates the paper billing system with the online enhanced customer service and payment options.

The disclosed system is an Internet Content Provider serving a "transaction community" of creditors and debtors. Said invention brings these two groups together to engage in alternative debt resolution via enhanced, interactive communication. The principle underlying the "transaction community" model is mutuality. A community is created when it is mutually beneficial for individuals to come together in a common understanding. The "transaction community" has enormous potential for mutuality because it has beneficial offerings for both the creditor and the debtor communities. The creditor community benefits by providing enhanced customer service and gaining increased profits. The debtor community benefits by gaining enhanced customer service and access to an array of services related to improving their financial condition.

The "transaction community" model provides transaction focal points or kiosks for credit and collection agencies to drive customers to complete transactions. The base technology of a "transaction community" is a sophisticated Internet/intranet based software application that allows users to access and input information related to a particular debt with any popular browser. The user is invited to resolve debt through direct mail correspondence from the collection agency. This letter includes the "transaction community" Internet address (URL) as well as a unique ID that allows users to view their debt and enter a valid settlement. The credit or collection agency can consult with its clients to decide which "transaction community" would be appropriate to direct the client's customers toward. For example, a collection agency's utility client would want to have their customers directed to a "transaction community" for utility payment.

Customers may select from a variety of settlement options listed on the HTML (HyperText Markup Language) page. The database records for the "transaction community" are synchronized with those of the corresponding debt collection agency and exchanged at regular intervals.

Initiation of debtor interaction with said "transaction community" requires several steps. First, a creditor invites debtor to "join" through mail and/or telephone to communicate using a new customer service option, "transaction community". Next, the customer enters the appropriate URL (Universal Resource Locator) into their Internet browser and begins interfacing with the "transaction community". The customer is welcomed and the purpose or goal of the "transaction community" is explained. Clearly explained to said customer is that: technology has improved and the customer should benefit from advances in technology, the Internet has improved the way a provider and a customer may communicate and interact regarding transactions, the "transaction community" helps customers solve their debts by opening the lines of communication in an efficient, confidential, private, controlled, and comfortable environment, and the "transaction community" is a customer friendly service interface presented on a computer via the Internet designed to mediate between creditor and debtor and collect delinquent receivables and debts. The "transaction community" then asks the debtor to provide a secure pass code (as provided by the creditor in the invitation) to bring up account information. The "transaction community" then states the current status of the account and gives the customer or debtor options for further negotiation. The first option could be an agreement to pay the outstanding debt. At this point, options for payment may be displayed. Payment options include secure credit card payment or secure acceptance of checks through integration of an automated customer check printing system into the Internet transaction system as a few of the possible payment means. Other possible responses, aside from agreeing to pay said debt could include, but are not limited to, discernable choices for the debtor and/or a free form slate for communication via forms or e-mail. Said customer may choose a reason or type a reason why said debt is not paid and the appropriate form is sent to the collection center. In addition, the creditor can choose automated decision making via an artificial intelligence means (debtor response is matched with creditor tolerances) located within said "transaction community" server or may choose human decision via an online e-mail collection center.

In addition to the debt resolution or transaction management, the "transaction community" could incorporate interactive content that may be of interest to the demographics and characteristics of the particular market segment. This content could include information, links to other financial and employment related sites, and other interactive services.

The system architecture is divided into two sides, client side and server side. On the client side, said debtor will be able to login to the "transaction community" web page by entering said unique identification code, typically a password generated by the system, and typically supplied to the debtor along with his/her bill or "past due" notice. Debtors/users/customers will be able to use leading web browser software to access the "transaction community" web page.

The application essentially consists of several HTML forms, containing a minimal set of ActiveX controls, to increase speed of operation and eliminate the necessity of downloading appropriate ActiveX controls from said web page.

The first screen may have two data entry fields, Customer ID, i.e., said unique identification code, and said secondary key. After proper authentication, which will take the user to another HTML page, an account presentation form may appear. The data displayed on this account form will be read from the remote database residing on the "transaction community's" server. These components should constitute the "back office" components.

The second form may contain, but is not limited to, the following data about the account: debtor identification code, secondary access key, debtor name, debtor address, debtor phone number(s), debtor fax number(s), debtor's e-mail address(es), DUNS number, initial creditor's name, amount of the loan, principal amount of loan, interest to date, other costs accrued, debt status, aging of the debt, and collection agent's name. If data for one of the fields is not available, a "blank" field may be displayed. Alternatively, an administrative or help page may also appear.

To further process the transaction, a button on said page, possibly labeled "Settlement Options", will then take users to another HTML page that may have five or more options; pay the debt off now with a credit card, dispute the debt, make a payment via phone, make a payment via check, or make a payment promise. The first option will allow debtors to pay off the debt with a credit card, in which case a standard credit card payment screen with data fields will appear. The second option will load an HTML page that will allow debtors to enter a dispute claim and e-mail it to the creditor or collection agent. It will also provide an option to request a verification of the debt. When a dispute message is received, some auto-decision making tools may be used, or the decision may be made manually and sent to the customer. The third option will provide users with telephone access to an authorized representative to arrange payment. With this option the customer will need to provide a representative with information about his/her checking account and/or bank requisites. The fourth option will allow users to arrange payment via a check or via a debit system on the account thereof. The fifth option will allow debtors to make a promise to send a payment via check or money order by a certain date, for a certain amount to an address that could be verified on the HTML form. An account number verification will also be requested from the customer. Additional HTML forms may be created or provided to support additional desired options. The disclosed system is payment processor neutral, i.e., as payment systems evolve, they may be incorporated into the present system.

On the server side, the system contains appropriate database software and appropriate system support software. Authenticated customers will be able to access the database records and administer the accounts to various utilities such as an Internet Transaction Control Center via either RAS (remote access service) or HTTP through their web browsers.

Database records contain all the necessary fields to describe each account contained in the database, such as the status codes, description fields, history field, status types, action codes, and transaction result codes.

It is anticipated that the present invention may be utilized in a broad range of applications other than debt collection—in short, as an Internet Transaction Control Center. It incorporates a Web Debt Settlement System, providing a method for coordinating with various types of collection systems. It is intended that the invention also allows for payment by check via the Internet, as well as a method for making philanthropic contributions. Such a feature would be made available by the creditor or biller as a promotion or at the consumer's choice, by which the consumer could choose from a list of charitable organizations.

The system is also equipped with a fundraising system providing direct mail to invite campaign contributions. The system keeps accurate records of the donors and their contributions, and it gives donors the option to pay immediately (via check, credit card or smart card), or to pay in accordance with payment plans approved by the organization. This fundraising attribute of the system is designed to ensure privacy while also providing the permanent contribution records required by campaign laws.

The system may also include a revenue sharing system. Upon using a particular system feature, the system would distribute revenue to the appropriate vendor of that feature. For example, when the consumer logs on to a Website, the system would distribute revenue to the direct mail provider/ system provider. When a consumer chooses to pay via credit card, revenue would be dispensed to the credit card processor. If the Call Center Button is hit, revenue would go to the call center button/center provider. Upon consolidation, the system will allocate revenue to the appropriate vendor. The system may also provide Help and Advertising for Dynamic Debt Resolution, as well as a Collection/Customer Service Call Center Button on the Web Page.

In preferred embodiments, the invention features a dynamic changing of graphical user interface to adapt to international language variances. The system utility will include interactive digital agents to guide the bill payer or the debtor through payment or customer service. The system will also incorporate digital advertising based on what is already known about the consumer.

Another component of the invention is an Education and Entertaining Bill Payment experience for American consumers. This will include educational information, debt counseling and debt consolidation, as well as games and promotions.

Thus, it is the object of this invention to provide a system and method for debt presentment and resolution through an Intranet or Internet content provider.

Further, it is also the object of this invention to provide a system and method comprising a plurality of "transaction communities" which are electronic forums for interaction between a plurality of parties through means of electronic mail (e-mail) or other such electronic communication means.

Furthermore, it is also an object of this invention to have an embodiment employing artificial intelligence means, whereby verbose instantaneous communication is made possible by the comparison of responses to tolerances.

In addition, it is also an object of this invention to provide a system and method further comprising an Internet/Intranet base software application that allows said debtors to access and input information related to a particular debt with any leading Internet browser software.

Further, it is an object of this invention to provide a web-based financial service accessable to any person with a PC and Internet connection.

Additionally, it is an object of this invention to provide a web-based financial service whereby database records at said "transaction community" are synchronized with those of the corresponding debt collection agency and exchanged at regular intervals.

Further, it is also an object of this invention to provide a web-based financial service ready to adapt to the new standards for online banking as they evolve.

Furthermore, it is an object of this invention to provide a web-based financial service that utilizes modern technology to facilitate debt collection.

Further, it is also an object of this invention to provide a web-based financial service that allows creditors to provide greater customer service to their customers.

Further, it is an object of this invention to provide a web-based financial service that allows creditors to increase profits.

In addition, it is also an object of this invention to provide a web-based financial service that provides debtors with information and access to an array of services geared towards improving their financial condition.

Further, it is an additional object of this invention to provide enhanced means in which a debtor and creditor may interact regarding transactions and debts.

Furthermore, it is an object of this invention to provide "transaction communities" which help debtors solve their debts by opening the lines of communication in an efficient, confidential, private, controlled, and comfortable environment.

Additionally, it is an object of this invention to provide a web-based financial service whose payment options for resolving debt include, but are not limited to, secure credit card payment or secure acceptance of checks through the integration of an automated customer check printing means into the Internet transaction system.

Furthermore, it is an object of this invention to provide a web-based financial service whose options aside from paying the debt include, but are not limited to, disputing the debt or making a payment promise, and means to accomplish same.

Further, it is an object of this invention to provide a web-based financial service whose server has appropriate database software and appropriate system support software.

Additionally, it is an object of this invention to provide a web-base financial service whereby authenticated customers will be able to access the server database records and administer the accounts to various utilities such as an Internet Transaction Control Center via either RAS or HTTP.

In addition, it is an object of this invention to provide a web-based financial service which requires a system generated unique identification code in order to gain access to account information.

BRIEF DESCRIPTION OF THE DRAWINGS

These and other objects will become apparent when one skilled in the art reads this disclosure along with the attached drawings.

FIG. 9 depicts the New Debtor Profile Screen, which allows the user to create a new debtor profile.

FIG. 11 depicts the New Creditor Profile Screen, designed to allow the user to create a new creditor profile.

FIG. 22 illustrates the typical notice received by a debtor from a collection agency regarding an overdue payment.

FIG. 28 illustrates the Account Information screen, and provides the user with general account information.

DETAILED DESCRIPTION OF THE INVENTION

A detailed illustrative embodiment of the present invention is disclosed herein. However, physical communication systems, data formats and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

The "transaction community" system is implemented as two Active Server applications. One of them is designed to provide potential debtors access to their accounts, while another, which allows maintenance of the data and settings, including system policies, is designed to be used by collectors, system administrators and operators, and probably third party users. Both applications share a common database, for instance, Microsoft SQL server 6.5. These systems also use client-side scripting (mostly JavaScript), Java applets and ISAPI extensions in addition to server-side (ASP) scripting. Usage of ActiveX components on client side is reduced to minimum (there is only Microsoft Internet Transfer control that is used on client side to facilitate file uploads) due to potential compatibility problems. This further exemplifies the reason why JavaScript was used instead of VBScript (Visual Basic Script) on the client side. The vast majority of Internet browsers support Java applets and JavaScript on all platforms, while ActiveX and Visual Basic Script is supported mainly by Microsoft Internet Explorer and primarily on Intel-based environments.

The server side environment includes Microsoft NT 4.0, Microsoft IIS 3.0 with ASP (as well as Front Page extensions for development purposes), SQL 6.5 along with TSQL debugger extensions for debugging purposes.

The client application can run on any Java-enabled browser supporting JavaScript. Netscape Navigator 3.0 or higher or Microsoft Internet Explorer 3.02 or higher is recommended. Microsoft Internet Explorer should be enabled to open pages containing ActiveX to upload files on server (from administrator's application).

The database scheme is relatively simple: it uses a "customer" table to represent debtors, a "creditor" table to store creditor profiles, a "collector" table to keep collectors' data and an "account" table to represent a debt instance. Another important table is "operation", which keeps all the account transactions.

Figure 1:
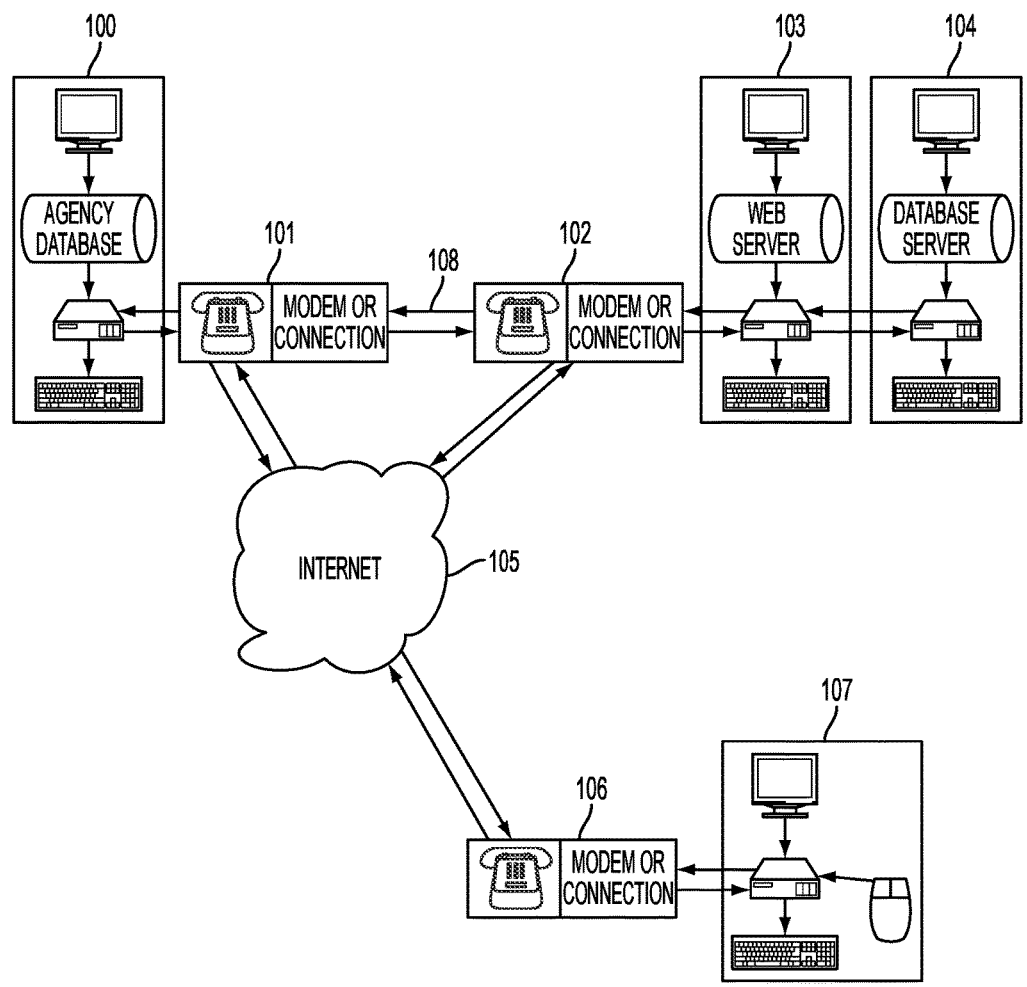
FIG. 1 depicts a block diagram illustrating "transaction community" process methodology.

FIG. 1 illustrates the overall networking scheme between the agency database 100, web server 103, database sever 104, and user 107. Said web server 103 and database server 104 are networked together via a secure local area Network (LAN) 109, innaccessable by outside users. Said agency database 100, web server 103, and user 107 are Networked together through the Internet 105, described above. Said agency database 100, web server 103, and user 107 connect individually to the Internet via appropriate bidirectional communication means (e.g., a modem) 101, 102, 106, respectively. Alternatively, said web server 103 and said agency database 100 may also be directly connected 108 via either a private LAN or wide area network (WAN) to effectuate faster communication.

Figure 2A:
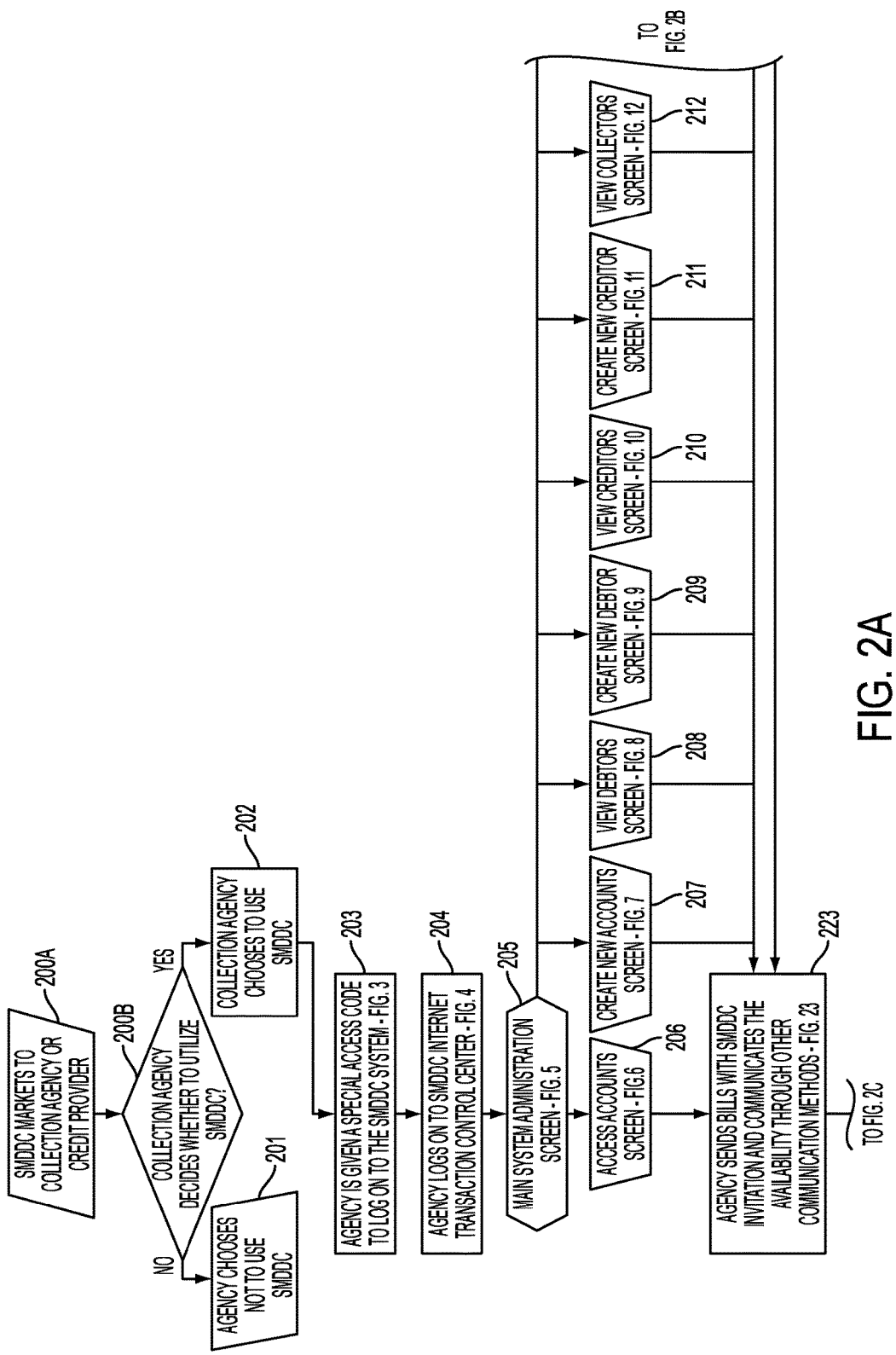
FIGS. 2A-E depict flow charts tracking the debt presentment and resolution process of the present invention.
Figure 2B:
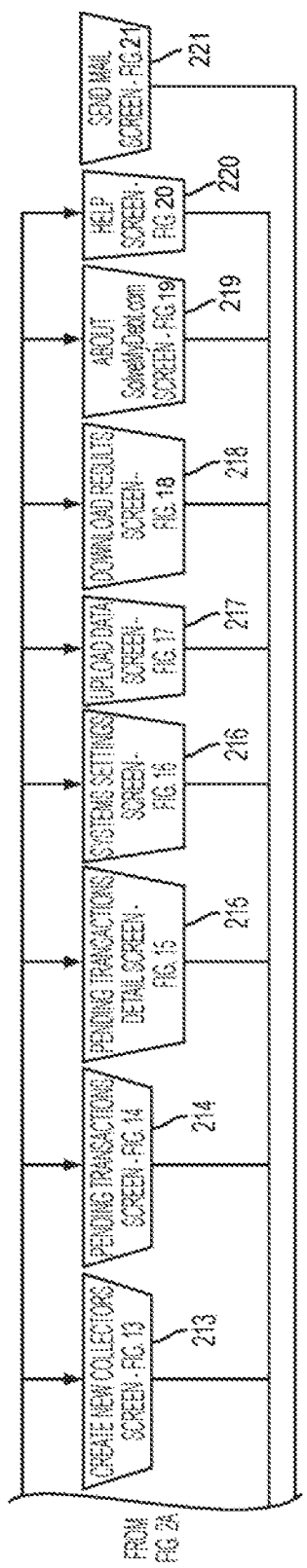

FIGS. 2A and 2B illustrate initial creditor interaction with the debt presentment system. Prior to the use of the system, said invention is marketed to collection agencies and credit providers through known methods 200A or integrated into currently available collection management systems. Said collection agency or credit provider would then decide 200B whether to utilize 202 the system or not 201. Should said collection agency or credit provider decide to use the system, a special access code is given to log on to the system 203 (see FIG. 3). After receiving said access code 203, said collection agency or credit provider may then log on to the system 204 (see FIG. 4). This brings the user to the Main System Administration Screen 205 (see FIG. 5). Here, the user is given several options. User may access Accounts Screen 206 (see FIG. 6), Create New Accounts Screen 207 (see FIG. 7), View Debtors Screen 208 (see FIG. 8), Create New Debtor Screen 209 (see FIG. 9), View Creditors Screen 210 (see FIG. 10), Create New Creditor Screen 211 (see FIG. 11), View Collectors Screen 212 (see FIG. 12), Create New Collectors Screen 213 (see FIG. 13), Pending Transactions Screen 214 (see FIG. 14), Pending Transactions Detail Screen 215 (see FIG. 15), System Settings Screen 216 (see FIG. 16), Upload Data Screen 217 (see FIG. 17), Download Results Screen 218 (see FIG. 18), About Screen 219 (see FIG. 19), Help Screen 220 (see FIG. 20), or Send Mail Screen 221 (see FIG. 21). After utilizing said screens (206-221) appropriately, said user may then send bills with an invitation 222 to use said system (see FIG. 22).

Figure 2C:
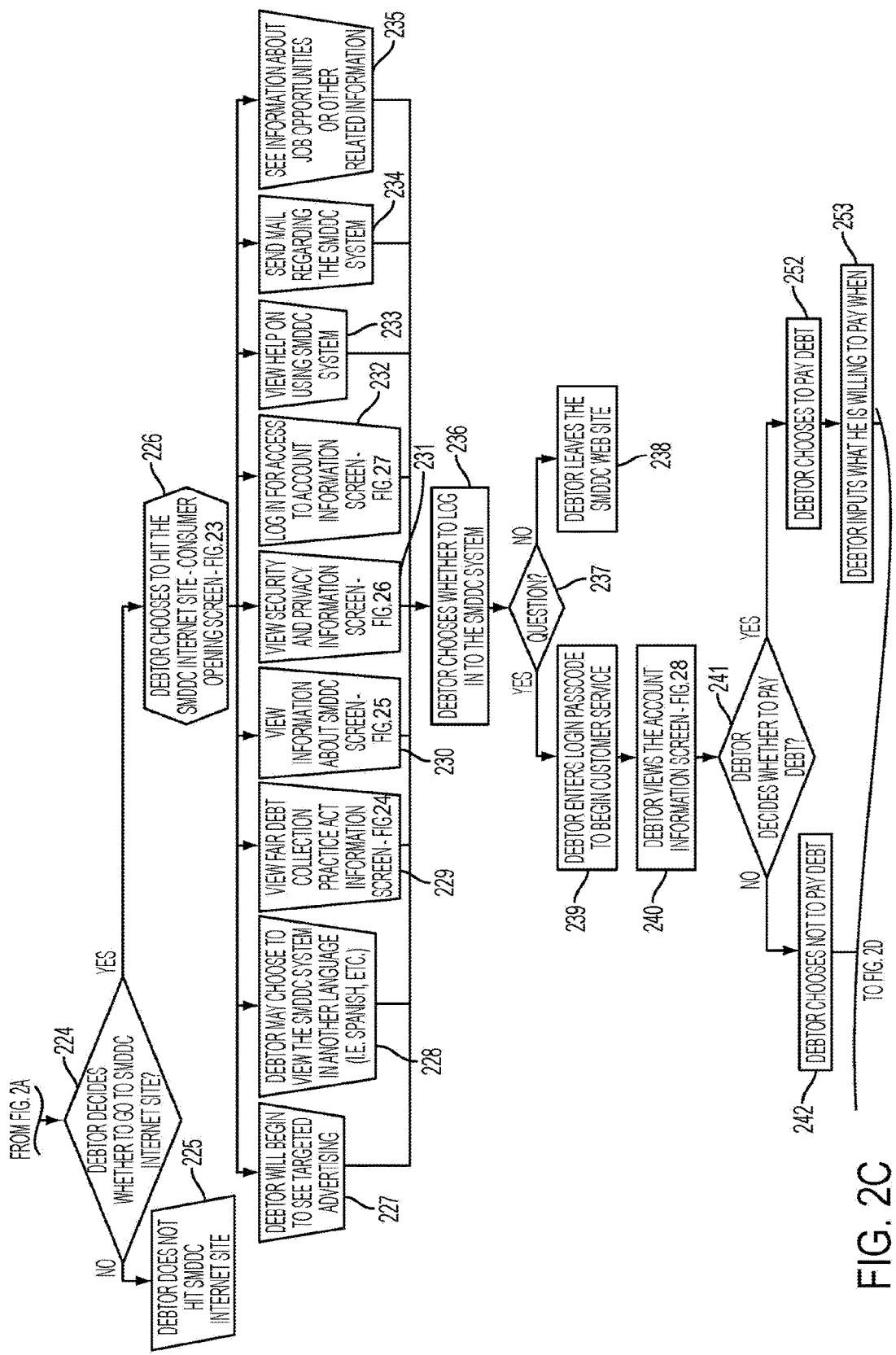

FIG. 2C illustrates the process wherein a debtor decides whether or not to pay an outstanding debt. After a debtor receives an invitation from said creditor indicating the availability of said system, debtor then decides 224 whether to use 226 (see FIG. 23) said system or not 225. Said debtor must then log on to the Internet and enter the appropriate URL (Universal Resource Locator) into their browser to access said system. When said debtor arrives at said system, said debtor is presented with several screens and options. Said screens and options could include targeted advertisements 227, options to view said system in another language 228, an information screen containing the Fair Debt Collection Act 229 (see FIG. 24), general information regarding said debt presentment system 230 (see FIG. 25), general information regarding transaction security and privacy information 231 (see FIG. 26), a login screen for access to account information 232 (see FIG. 27), a help screen 233, an option to send electronic mail to the administrator of said system, and general information regarding job opportunities or other information pertinent to the demographics of said debtors. After viewing said screens and options (227-235), said debtor may then decide 236 whether to logon into said system when presented with option 237. If debtor decides not to login to said system, said debtor leaves 238 said system. If said debtor decides to login, an appropriate login passcode must be entered 239 to begin customer service. After login, said debtor is presented with the account information screen 240 (see FIG. 28). Upon reviewing the presented debt(s), said debtor decides 241 whether or not to pay said debt(s). User may decide not to pay said debt(s) 242, or may decide to pay said debt 252 and work out an appropriate payment schedule 253.

Figure 2D:
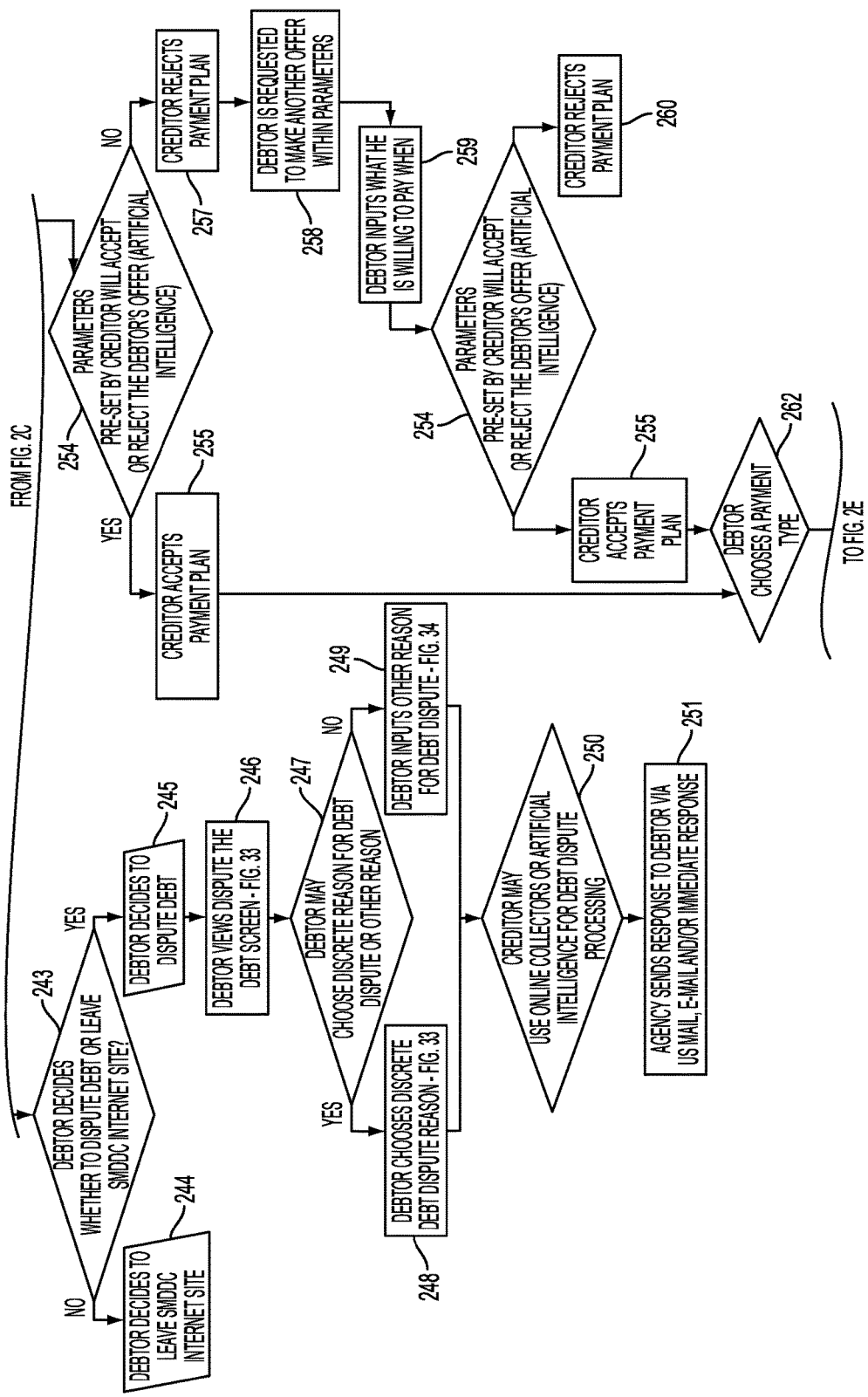

FIG. 2D illustrates the process for paying or disputing a debt. With respect to the aforementioned step 242 (see FIG. 2C), after deciding not to pay said debt, said debtor is given the option to dispute the debt 243. If said debtor decides not to dispute said debt, said debtor leaves said system 244. If said debtor decides to dispute said debt 245, the Dispute the Debt screen is displayed 246 (see FIG. 33). Here, said debtor may choose how to dispute said debt 247. Said debtor may choose a discrete debt dispute reason from a given list 248 (see FIG. 33), or said debtor may choose an option to input their own reason for disputing the debt 249. In either case, the creditor then processes the debtors dispute 250 and sends an appropriate response to said debtor 251. With respect to aforementioned step 252 (see FIG. 2C), if customer decides to pay said debt and creates a payment schedule 253 (see FIG. 2C), said payment schedule will be compared to parameters preset by said creditor through artificial intelligence 254 or by using live collectors monitoring account status. If said credit accepts said debtors payment schedule 255, said debtor will then choose a payment type 262. If said creditor rejects said payment plan 257, said debtor is instructed to make another offer within said creditors parameters 257. The artificial intelligence process of comparing debtors payment schedule to that required by said creditor is illustrated in an additional iteration comprising steps 259 through 260. It should be noted, however, that this is merely illustrative. As many iterations as necessary for said creditor to accept said debtor's payment schedule may occur. After an acceptable payment schedule is found, said debtor then chooses a payment type 262.

Figure 2E:
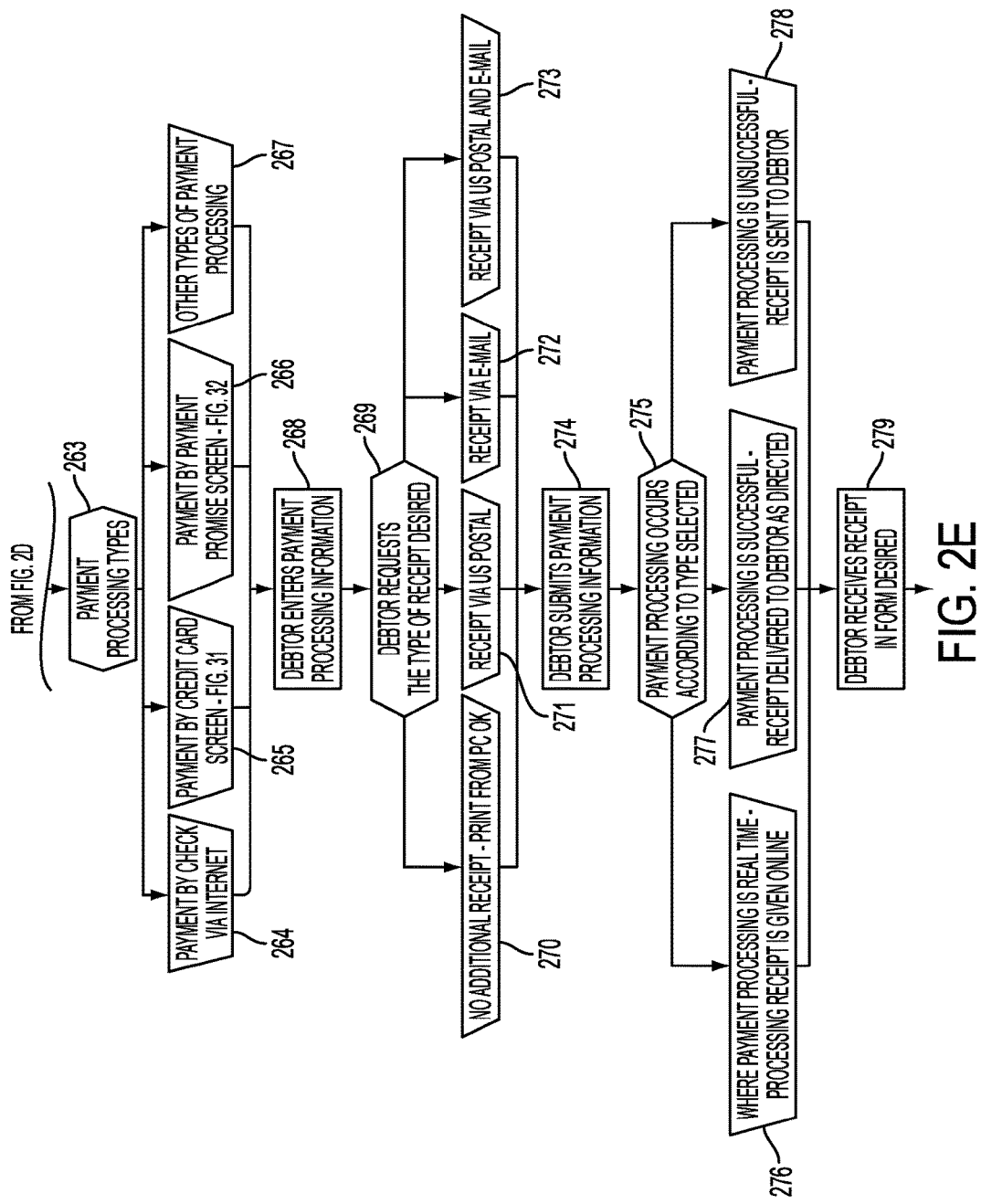

FIG. 2E illustrates the process of said debtor choosing a payment method. Referring to aforementioned step 262 (see FIG. 2D), when said debtor chooses a payment type, payment processing type are presented 263. Payment options may include: payment by check via Internet 264, payment by credit card screen 265 (see FIG. 31), payment by payment promise 266 (see FIG. 32), or other type of payment processing 267. After choosing a payment processing option, said debtor enters payment processing information 268. Said debtor may then choose why type of receipt they would prefer 269. Receipt options include: no additional receipt 270, receipt via regular mail 271, receipt via electronic mail 272, or receipt via electronic mail and regular mail 273. After submitting all relevant payment processing information 274, payment processing occurs as per the debtors selected method. Said payment processing may proceed in realtime whereby receipt processing is performed on-line 276, payment processing may occur at a later date 277, e.g., batch processing, or the payment processing may be unsuccessful 278. After said payment processing, said debtor receives receipt in form specified in aforementioned step 269.

Figure 3:
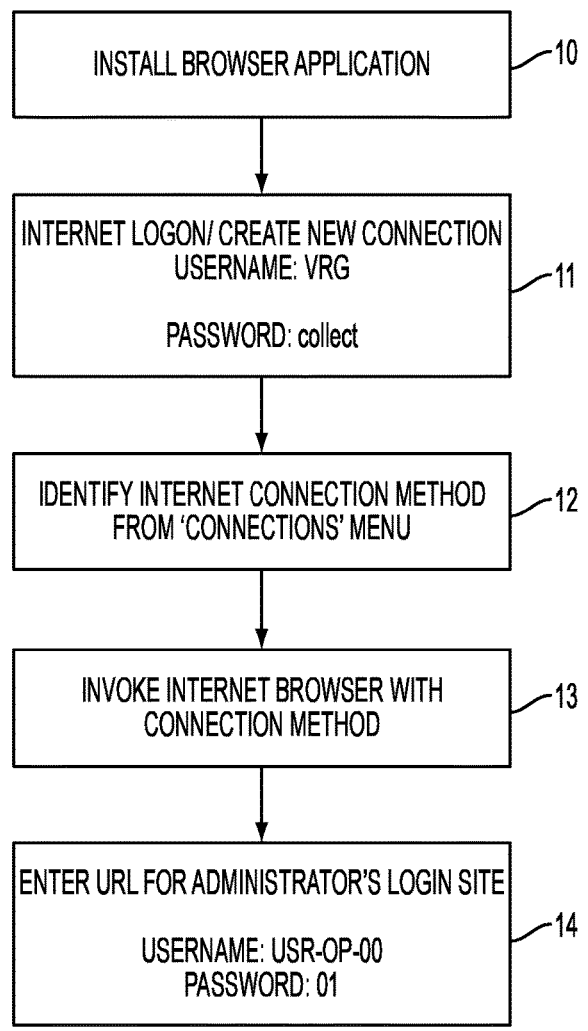
FIG. 3 depicts a logon instruction sheet.

FIG. 3 depicts a log-on instruction sheet for a debt collection application utilizing the present invention.

Figure 4:
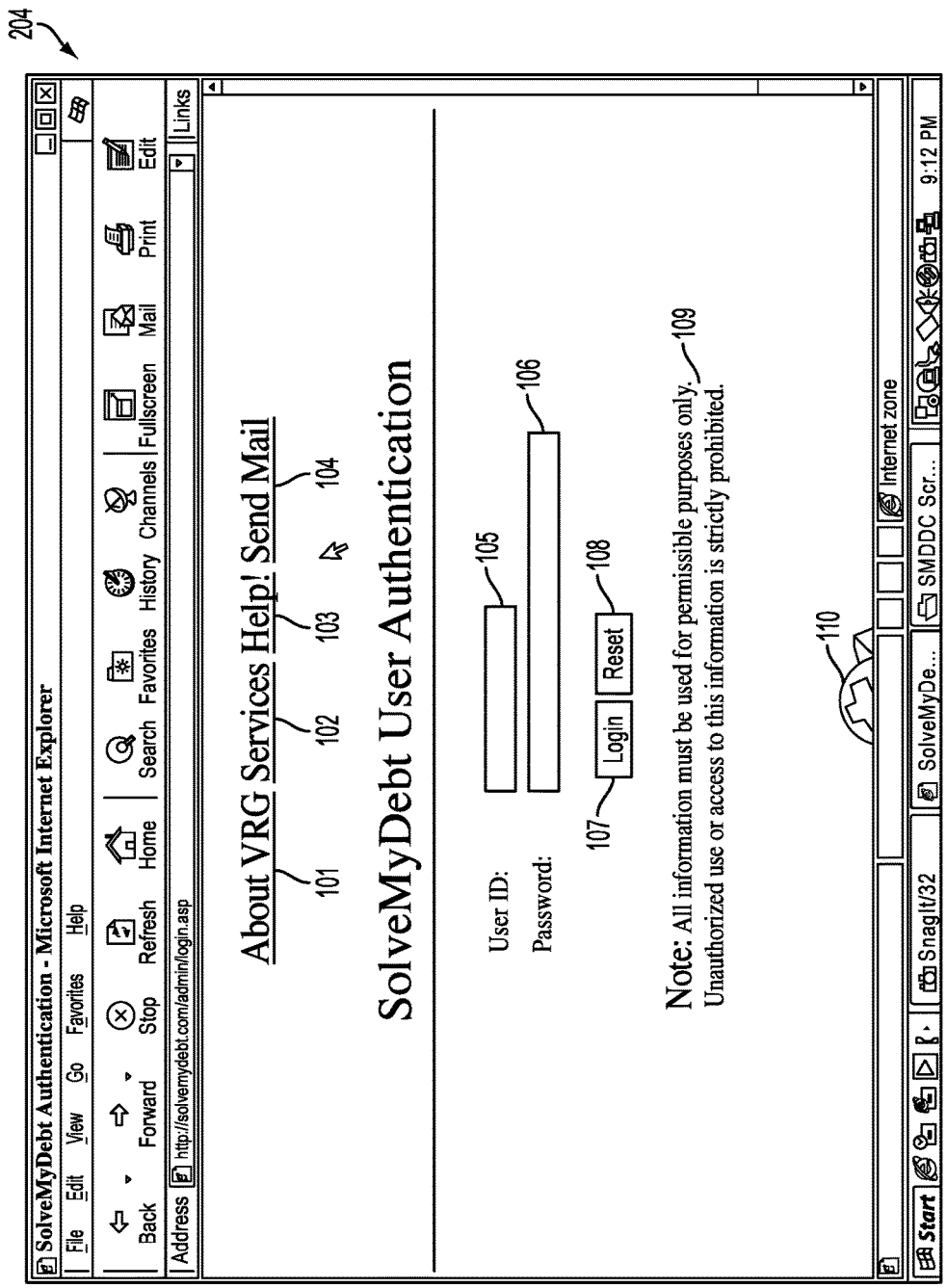
FIG. 4 depicts the Login Screen that a user will encounter upon connection to the debt resolution website.

FIG. 4 depicts the Login Screen that a user will encounter upon connection to the debt resolution website. As is typical with such applications, the user is presented with various options. For example, by clicking on "About VRG 101," the user can find information about the debt collection company. Other related services may be accessed by clicking "Services 102." "Help 103" provides instructions on using the program. In the event the user would prefer information via standard mail, he or she may click "Send Mail 104."

Access to the program is limited to users who have been previously provided (by mail or otherwise) with a "User ID 105" and "Password 106" and once these have been typed, the user will click "Login 107" to enter the program. To stop transmitting the said information or to re-enter different information, click "Reset 108."

The "Restricted Access Warning 109" on the bottom of the screen is to caution unauthorized users from entering and viewing the program. Once the user's ID and password have been transmitted, the user is logged in.

Figure 5:
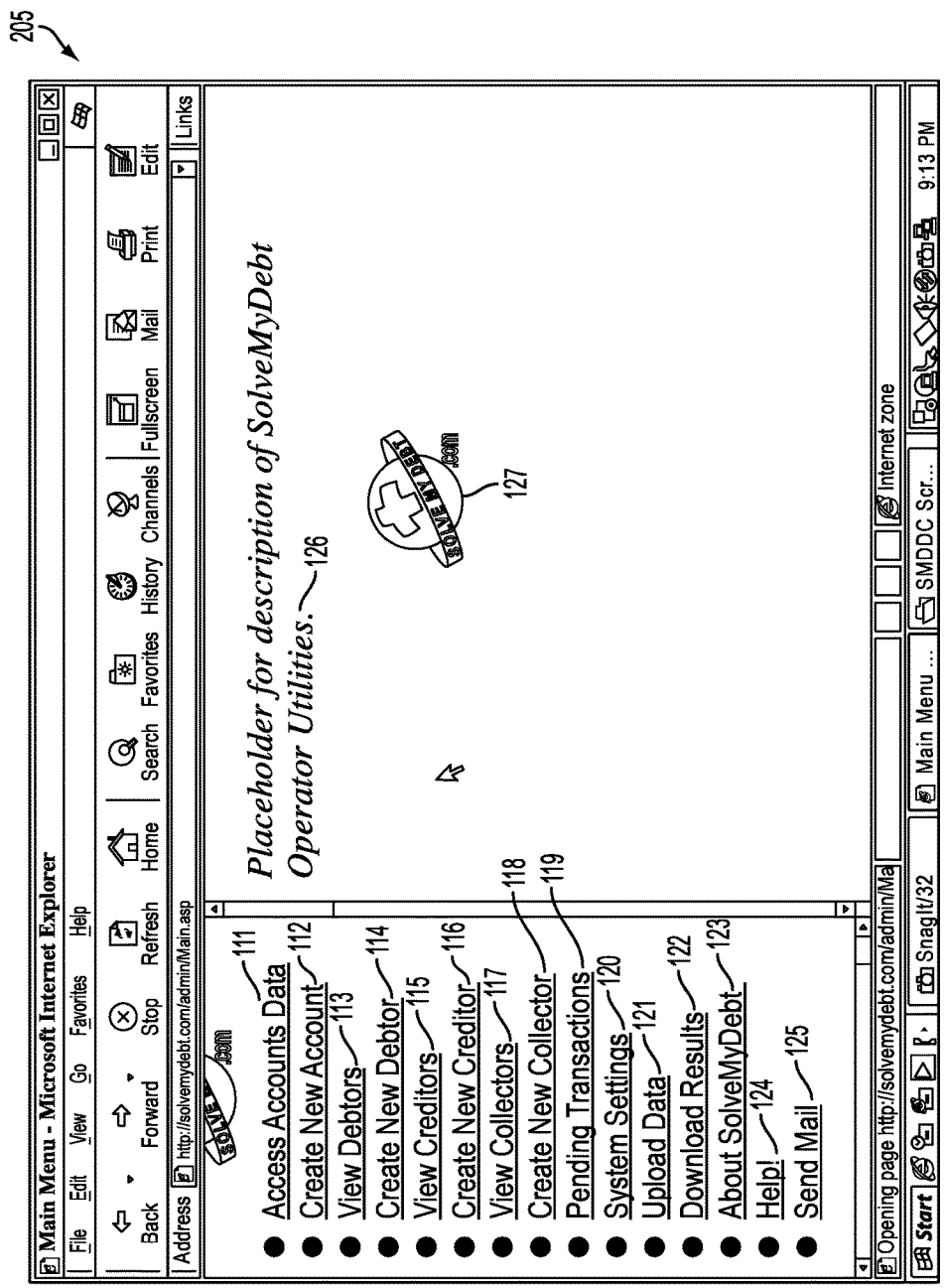
FIG. 5 depicts the Main Menu Screen that a user will encounter upon successfully logging into the program.

FIG. 5 depicts the Main Menu Screen that a user will encounter upon successfully logging into the program. The Main Menu Screen has the following hyperlinks to other areas of the database and are self explanatory: "Access Accounts Data 111;" "Create New Accounts 112;" "View Debtors 113;" "Create New Debtor 114;" "View Creditors 115;" "Create New Creditor 116;" "View Collectors 117;" "Create New Collector 118;" "Pending Transactions 119;" "System Settings 120;" "Upload Data 121;" "Download Results 122;" "About Solve My Debt 123;" "Help 124;" "Send Mail 125" and "Description of Operator Utilities 126."

Figure 6:
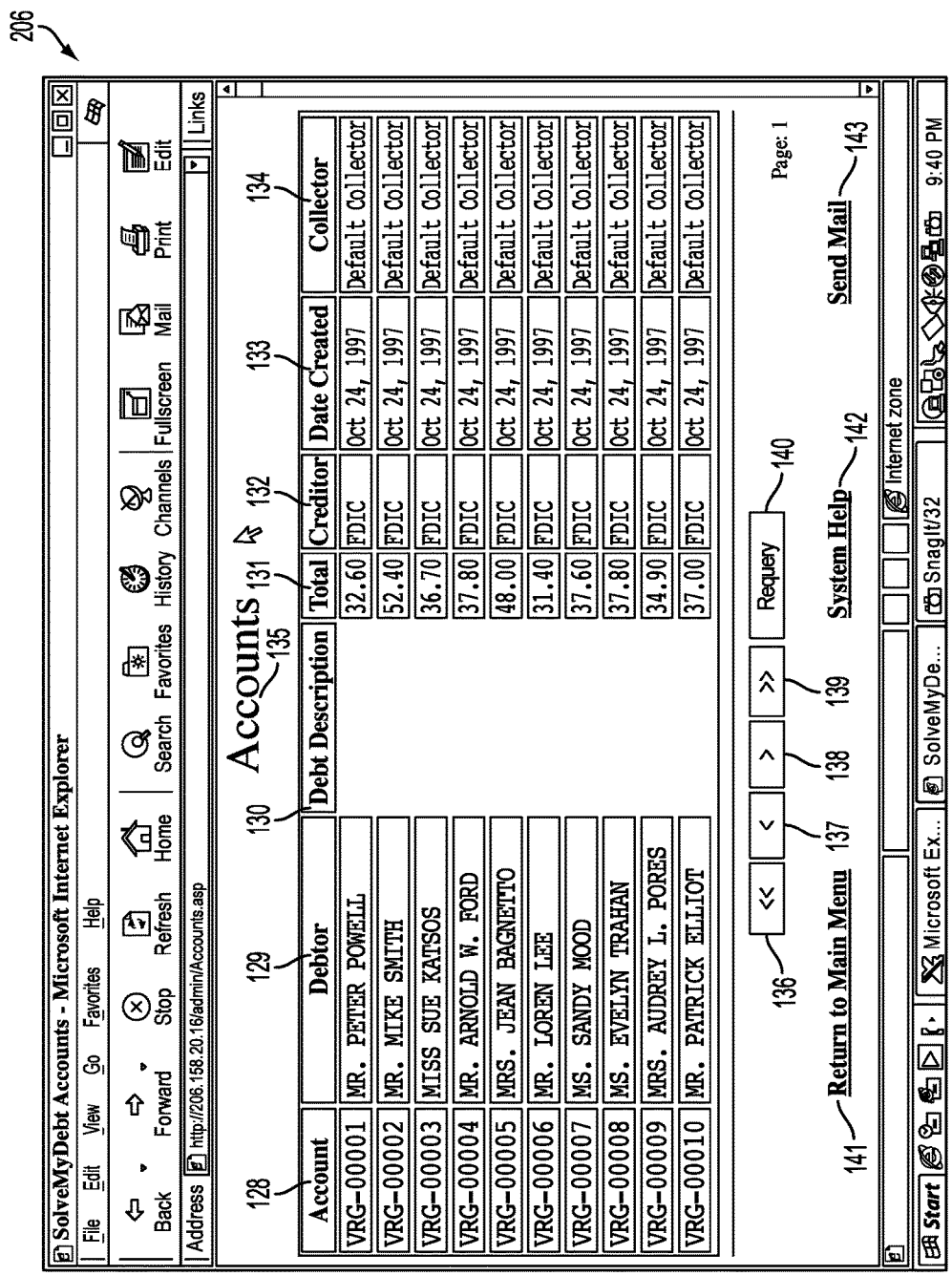
FIG. 6 depicts the screen the user will encounter when accessing account information.
Figure 7:
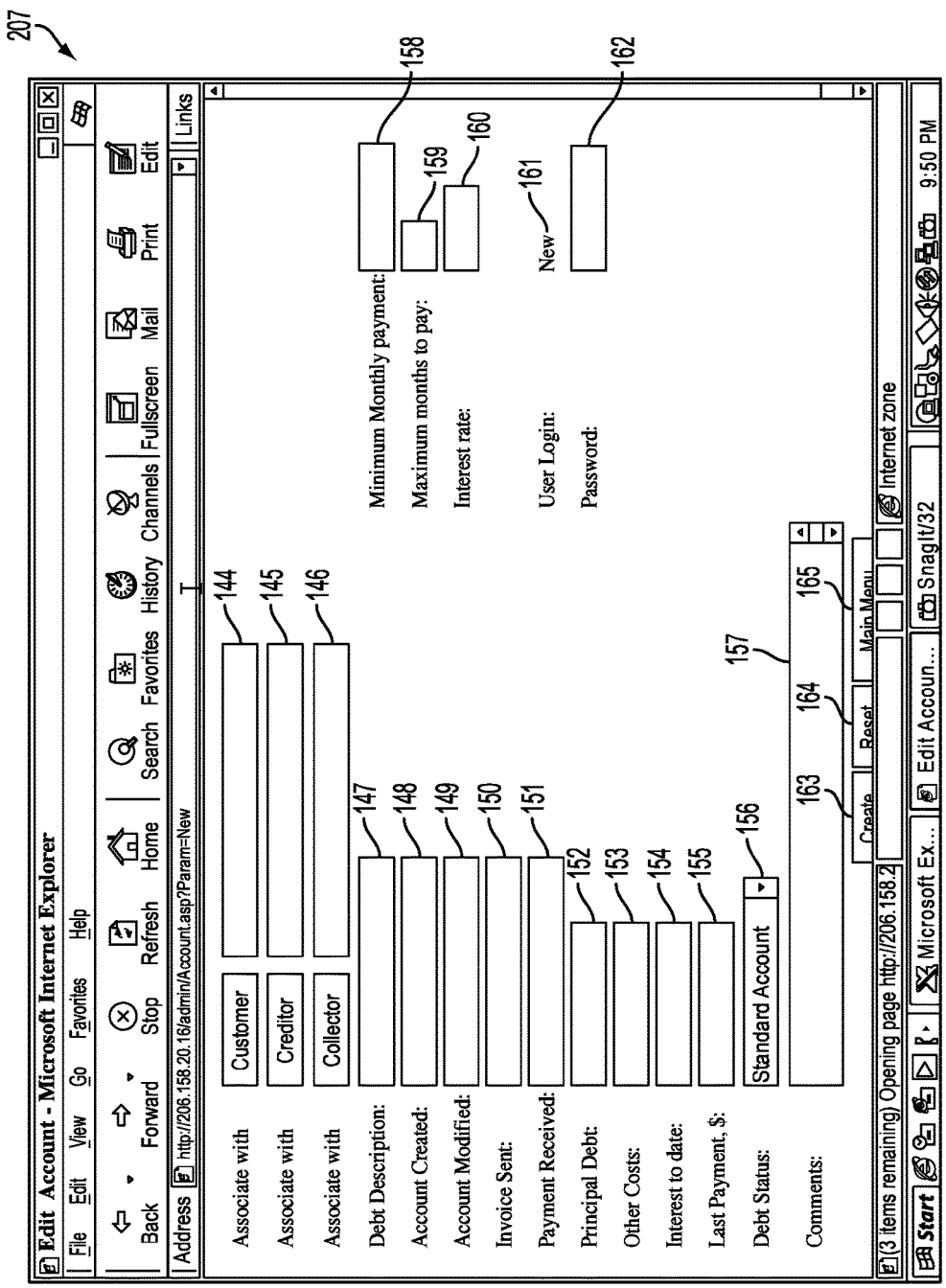
FIG. 7 permits a user to create a new account.

If the user chooses to access his or her account, then he or she will be brought to FIG. 6, which depicts the screen the user will encounter when accessing account information. The information displayed consists of standard account information, including "Account Number 128," the "Name of the Debtor 129," a "Description of the Debt 130," an illustration of the "Total Due 131," "Identification of the Creditor 132," indication of the "Date the Debt was Created 133," and a "Description of the Collector 134." The "Branding 135" is illustrated as well. The remainder of FIG. 6 consists of methods for navigating the account information page, allowing one to move "back one entire page 136," "back by a single entry (137)," "forward by a single entry 138," "forward an entire page 139," and to "Requery 140." The user can also "return to the main menu 141," as well as link to the system's "Help Feature 142" and "Send Mail 143."

Alternatively, a user may choose to develop a new account. The screen illustrated in FIG. 7 permits a user to do so. To create a new account, the user will input the "Customer Name 144," the "Identity of the Creditor 145," as well as an "Illustration of the Creditor 146." The screen also allows for the user to indicate a "Description of the Debt 147," the "Type of Account Created 148" and whether the account has been "modified 149," whether an "invoice was sent 150," "when payment is received 151," the "Amount of the Principal Debt 152," "Other Costs a Consumer Might Owe 153," an indication of the "Interest Accrued to Date 154," the "Amount of the Last Payment 155," the "Status of the Debt 156" as well as any "Comments 157." The screen also allows the user to put in the "Monthly Payments 158," the "Maximum Number of Months in which to pay 159," the "Interest Rate 160," the "User Login Identification 161," and the "Password 162." Finally, this screen will process the aforementioned information upon clicking "Create 163." The user can clear the information in the fields by clicking "Reset 164" or the return to the previous "Main Menu 165."

Figure 8:
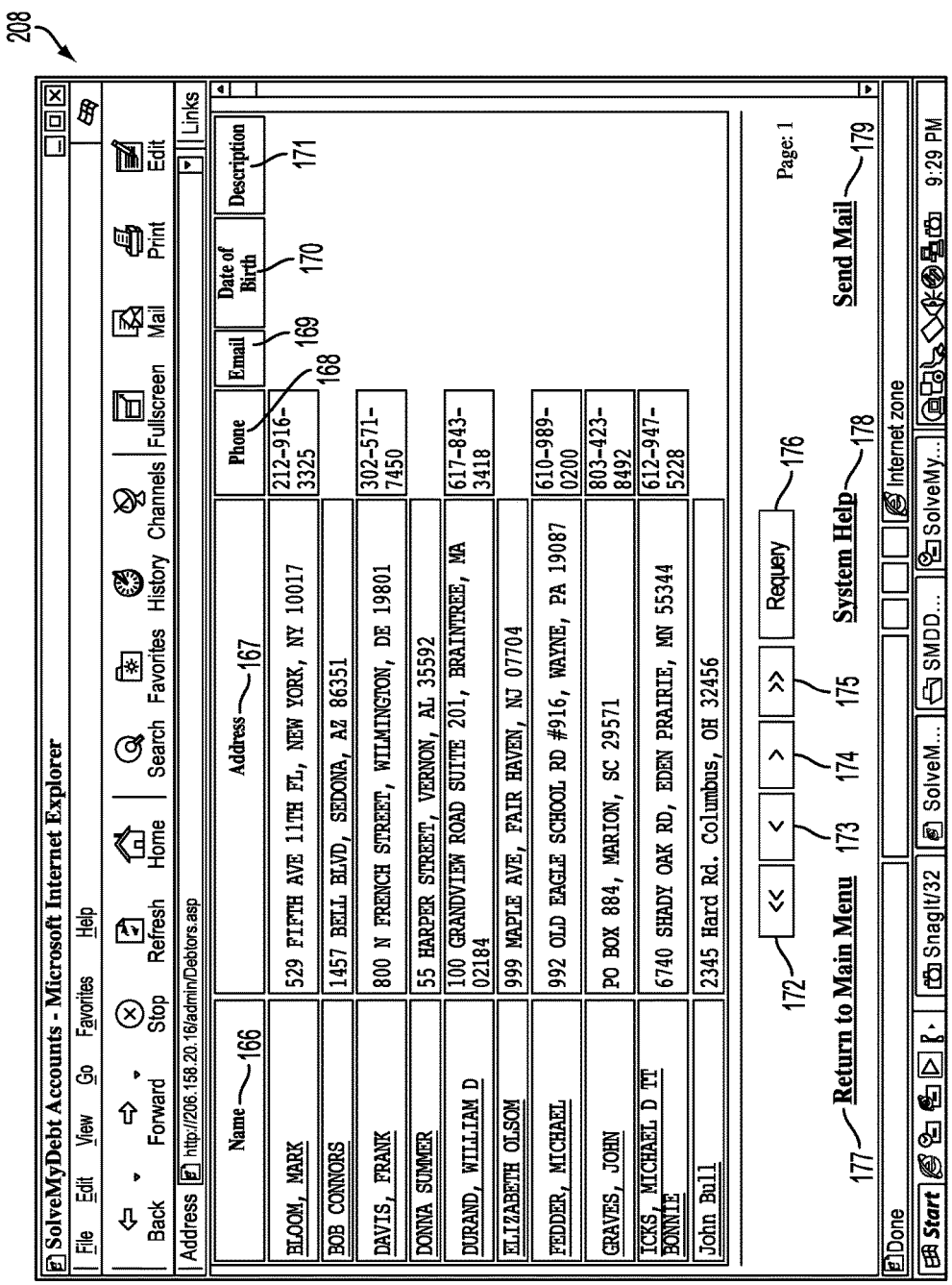
FIG. 8 depicts the View Debtors screen, which lists debtor profiles.

A user who seeks a description of a debtor can obtain one. FIG. 8 depicts the View Debtors screen, which lists debtor profiles. This screen tabulates information in the system by "Name 166;" "Address 167;" "Phone 168;" "E-mail account 169;" "Date of Birth 170;" and "Description 171." The user can page backward or forward by clicking the "Back 172" and "Forward 175" buttons, respectively. Likewise, the user can move backward or forward by a single debtor in the listing by hitting buttons 173 and 174, respectively. One can ask questions of a particular debtor by clicking the "Requery button 176." The user can return to the main menu "Return to Main Menu 177," ask for help "System Help 178," or send mail "Send Mail 179."

Rather than viewing the profile of an already existing debtor, a user may create a description of a new debtor. FIG. 9 depicts the New Debtor Profile Screen. This screen allows the user to input the personal profile of each debtor. Such information would include the "Name 180," "Address (181-185)," "Phone 186," and "other personal data 187-194." The user can input additional "Comments 195" and input the above information into the system database for later retrieval and usage by clicking "Submit 196." The user can also clear the information in the fields by clicking "Reset 197" or return to the "Main Menu 198."

Figure 10:
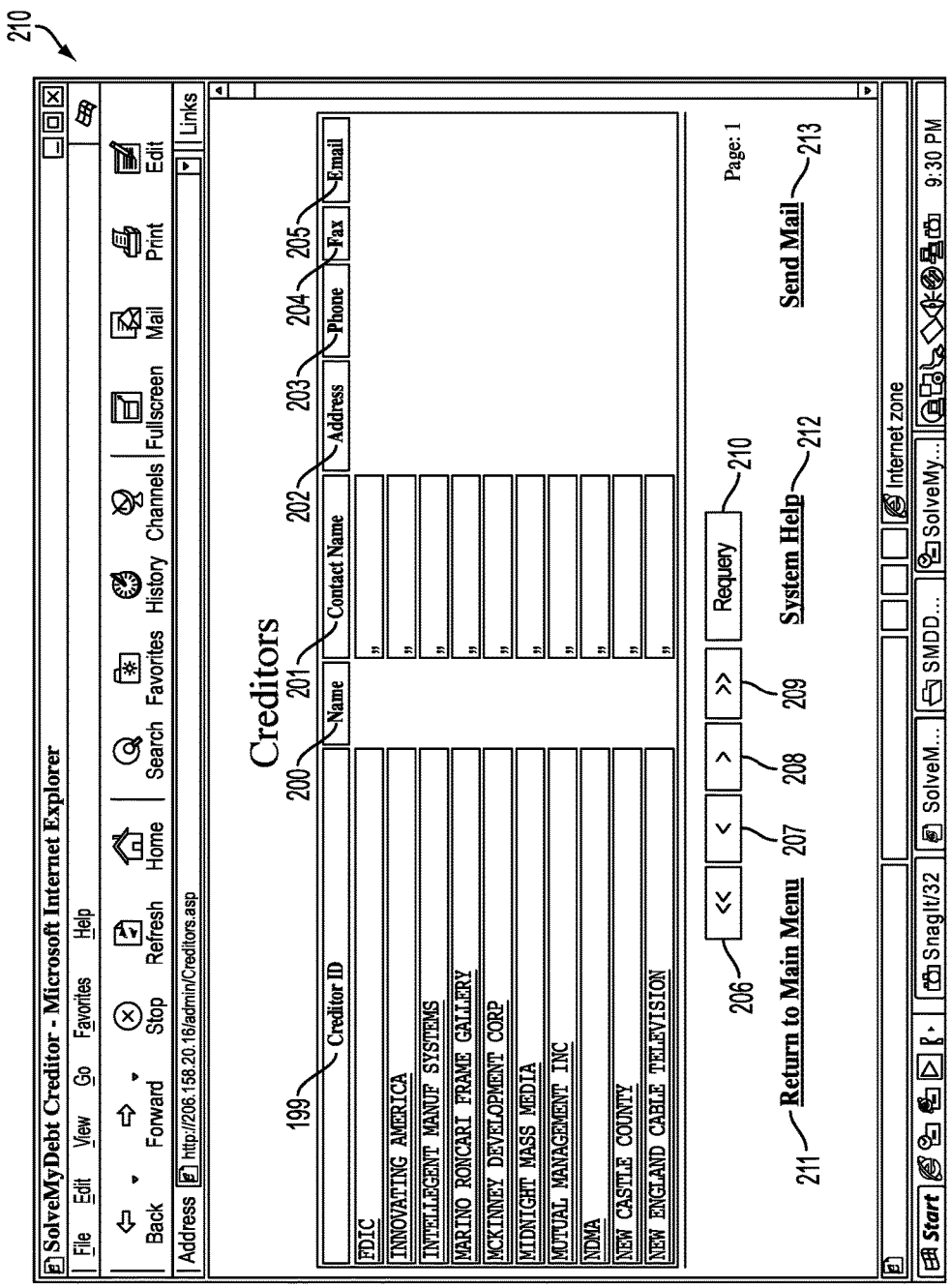
FIG. 10 depicts the View Creditors Screen, which lists information regarding creditors.

Similarly, a user may seek to review a description of an already existing creditor or may desire to create a new one. This is achievable via the screens depicted in FIG. 10 and FIG. 11. FIG. 10 depicts the Creditors Screen. This screen tabulates creditor information in the system by "Creditor ID 199;" "Name 200;" "Contact Name 201;" "Address 202;" "Phone 203;" "Fax 204;" and "E-mail account 205." The user can page backwards or forwards by clicking the "Back 206" and "Forward 209" buttons, respectively. Likewise, the user can go backward or forward by a single debtor in the list by hitting buttons 207 and 208, respectively. One can ask questions of a particular debtor by clicking the "Requery button 210." The user can return to the main menu "Return to Main Menu 211," ask for help "System Help 212," or send mail "Send Mail 213."

FIG. 11 depicts the New Creditor Profile Screen. This screen allows the user to input the personal profile of each creditor. Such information would include the "Organization 214," the "Name 215," "Address (216-220)," "Phone 221," and other "data (222-224)." The user can input additional "comments 225" and input the above information into the system database by clicking "Submit 226." The user can delete information by clicking "Reset 227" or the user can return to the "Main Menu 228."

Figure 12:
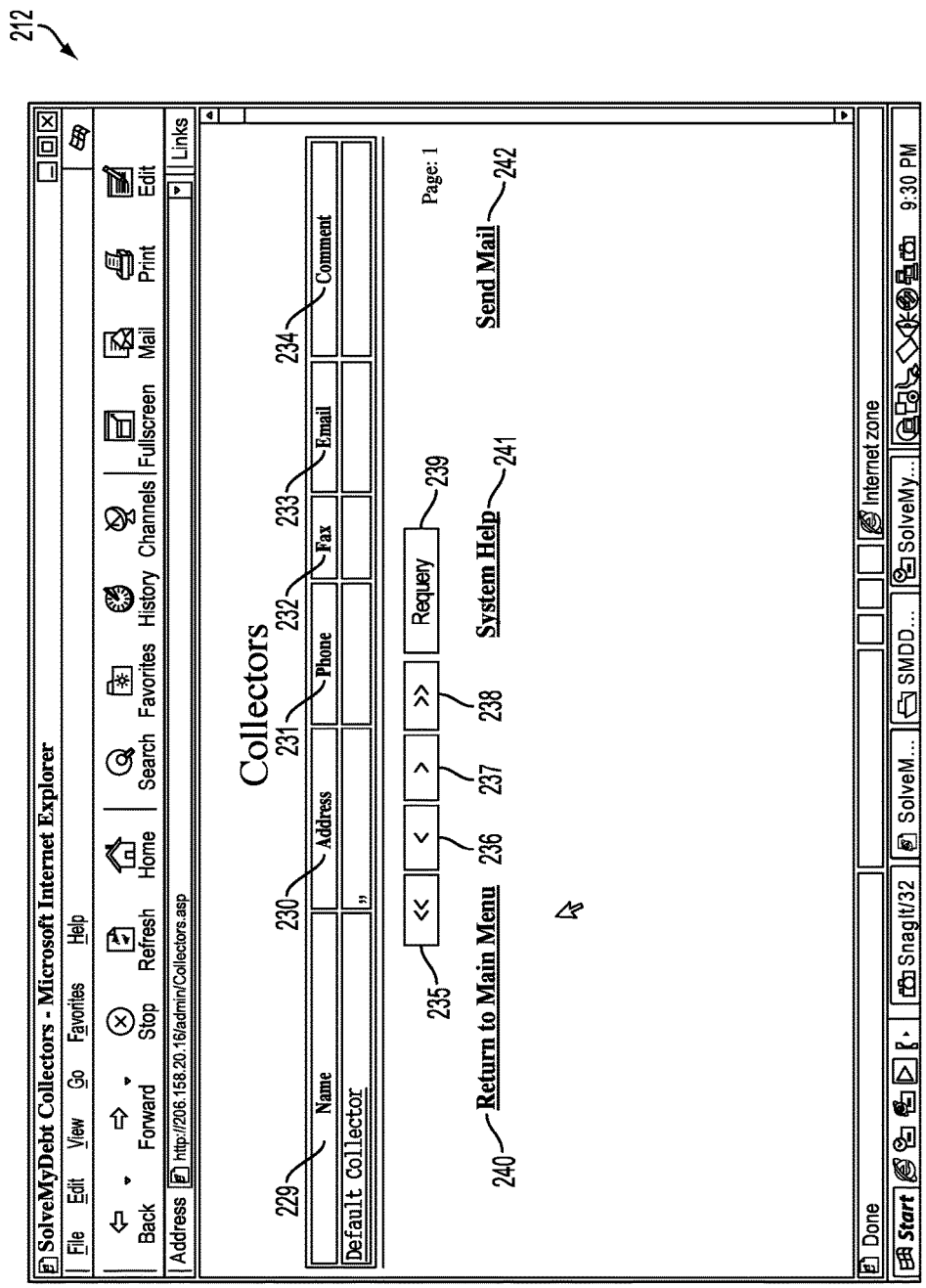
FIG. 12 depicts the Collectors Screen, and includes a listing of collector profiles.

A user can obtain a list of collector profiles, as well. FIG. 12 depicts the Collectors Screen. This screen allows the user to list collectors, and it includes a hyperlink to detailed debtor information. The screen lists the collectors by "Name 229," "Address 230," "Phone 231," "Fax Number 232," "Email 233," and "Comments 234." The remainder of FIG. 12 consists of methods for navigating the account information page, allowing one to move "back one entire page 235," "back by a single entry 236," "forward by a single entry 237," "forward an entire page 238," to "Requery 239," "return to the main menu 240," as well as link to the system's "Help Feature 241" and "Send Mail 242."

Figure 13:
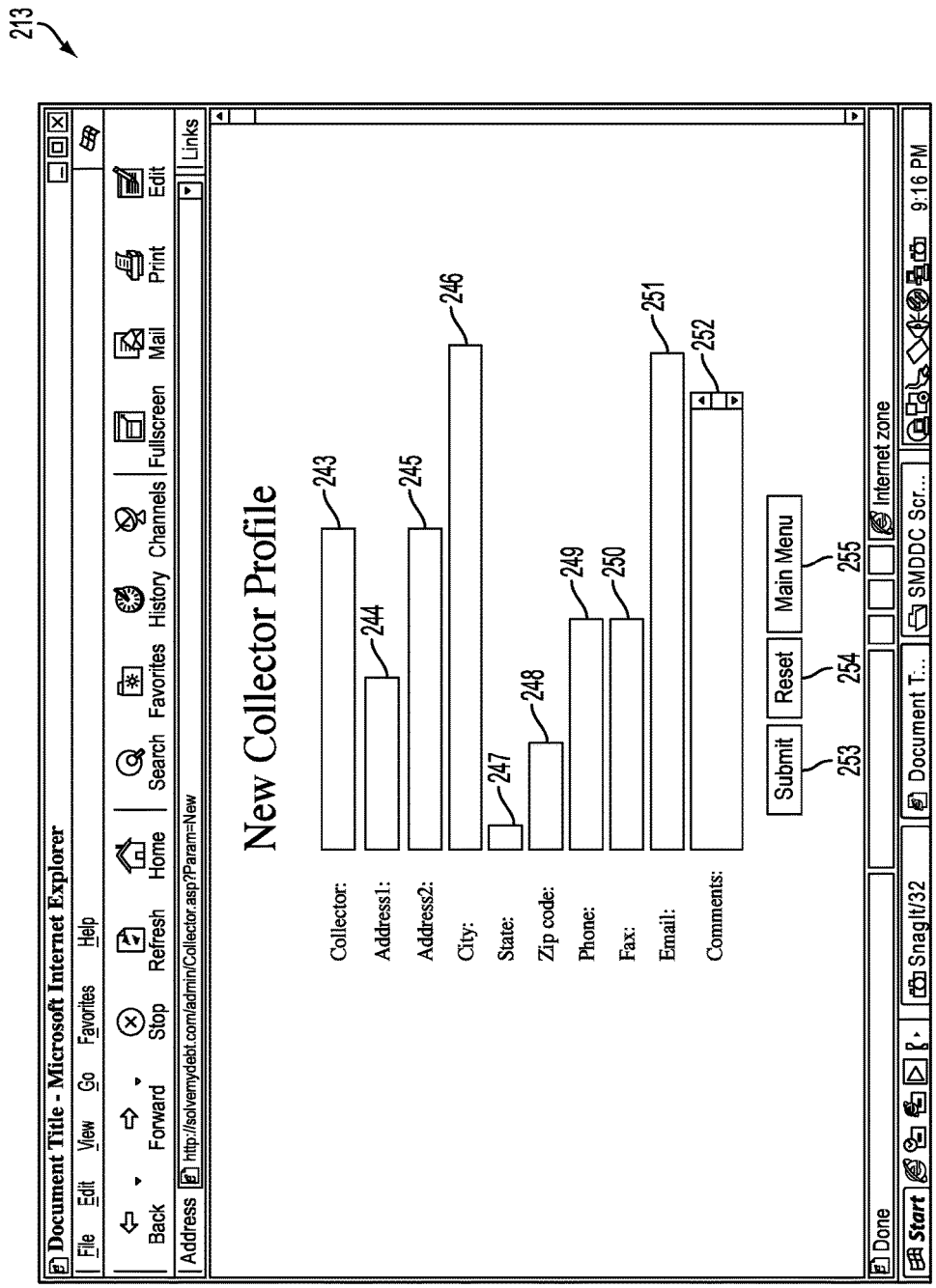
FIG. 13 depicts the New Collector Profile, the purpose of which is to allow the user create a profile for a new collector.

It is also possible to create a new collector profile. FIG. 13 depicts the New Collector Profile screen, which allows the user to input information about a collector such as "Name 243," "Address 244-248," "Phone 249," "Fax Number 250" "Email 251," and "Comments 252." The system can process the aforementioned information, putting it into the system database for later retrieval and usage, by clicking "Submit 253." The user can clear the information in the fields by clicking "Reset 254" or the user can return to the "Main Menu 255."

Figure 14:
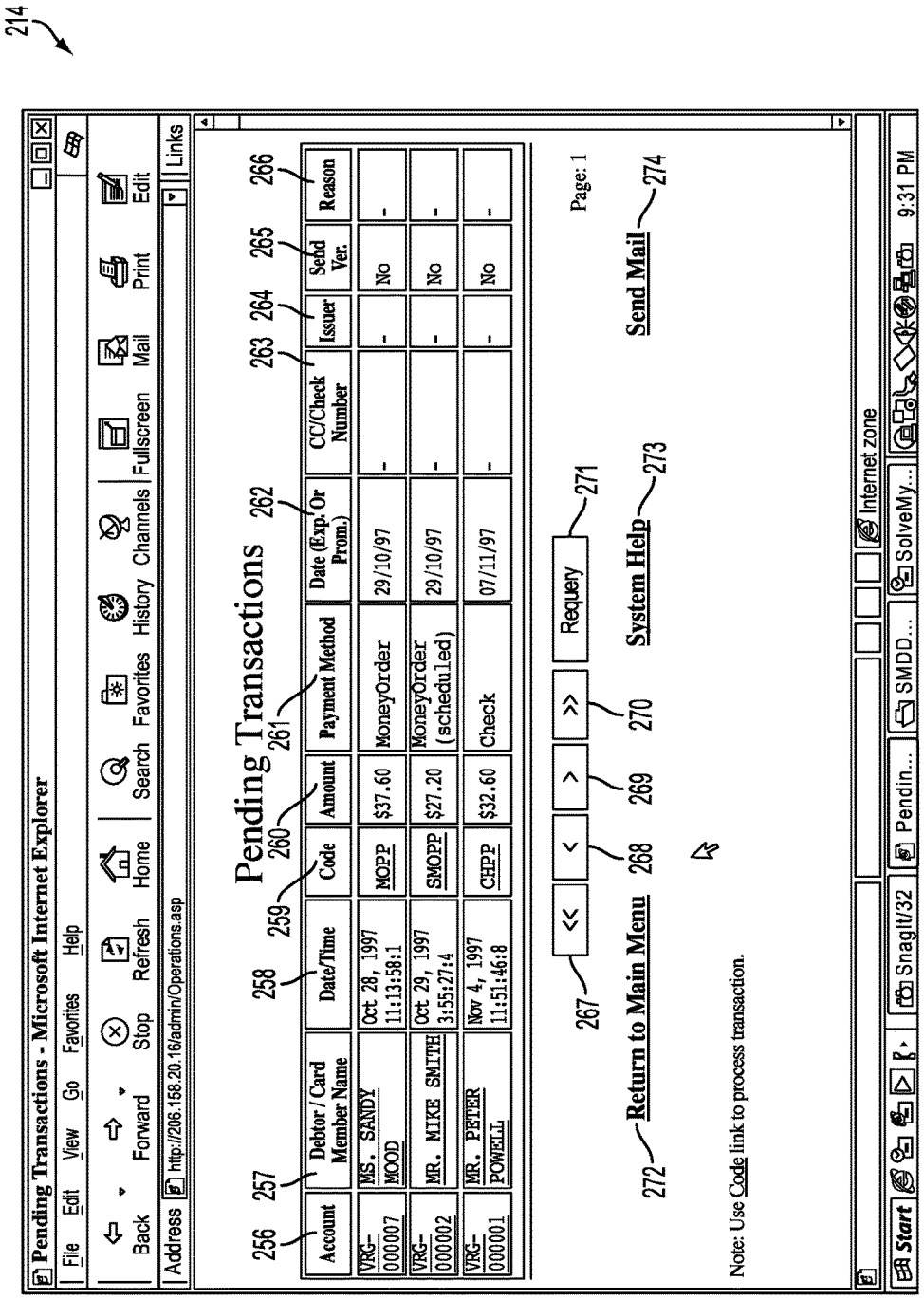
FIG. 14 depicts the Pending Transactions Screen, and provides a listing of all impending transactions.

FIG. 14 depicts the Pending Transactions Screen. This screen allows the user to ascertain the status of any pending transactions through the "Account 256" feature. The user can gain access to "Debtor/Card Member Name 257," "Date/Time Information 258," an illustration of the "Code 259," which includes a hyperlink to singular pending transaction information, the transaction "Amount 260" information, the chosen "Payment Method 261," the "Date (Expected or Promised) 262," and the pending transaction "CC/Check Number 263." The user can also obtain the name of the "Issuer 264," information regarding a "Send Verification 265," and "Reason 266" information. The user can navigate around the page via the "Back by Page 267" feature, as well as "Back by Single 268," "Forward by Single 269," "Forward by Page 270," "Requery 271," and "Return to Main Menu 272." The screen also features a hyperlink to information about the "System Help 273," as well as a hyperlink to "Send Mail 274."

Figure 15:
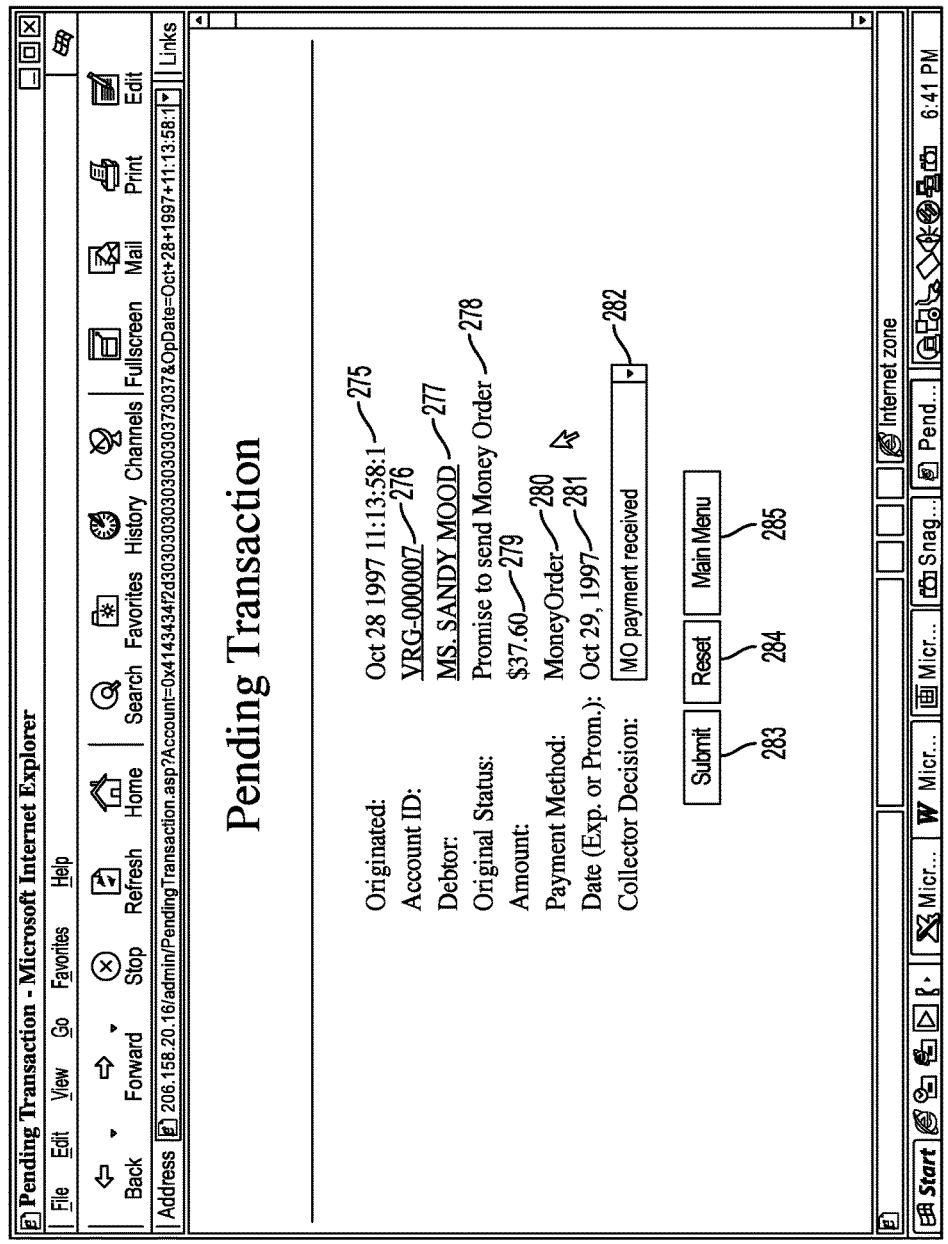
FIG. 15 depicts a more detailed version of the Pending Transactions Screen.

FIG. 15 depicts a more detailed version of the Pending Transaction Screen. "Originated 2751" allows a user to ascertain the date on which the debt originated, and "Account ID 276" displays the account identification number, with a hyperlink to the detailed account information screen. "Debtor 277" provides the name of the debtor, and includes a hyperlink to the detailed debtor information screen. Additional information about the account is provided through the "Original Status 278," the "Amount 279," "Payment Method 280" information, "Date (Expected Or Promised) 281," and "Collector Decision 282" including ability to change decision with pull down menu. "Submit 283" allows the user to submit the information into the system database, while "Reset 284" permits the user to clear the fields. "Return to Main Menu 285" allows the user to return to the system's main menu.

Figure 16:
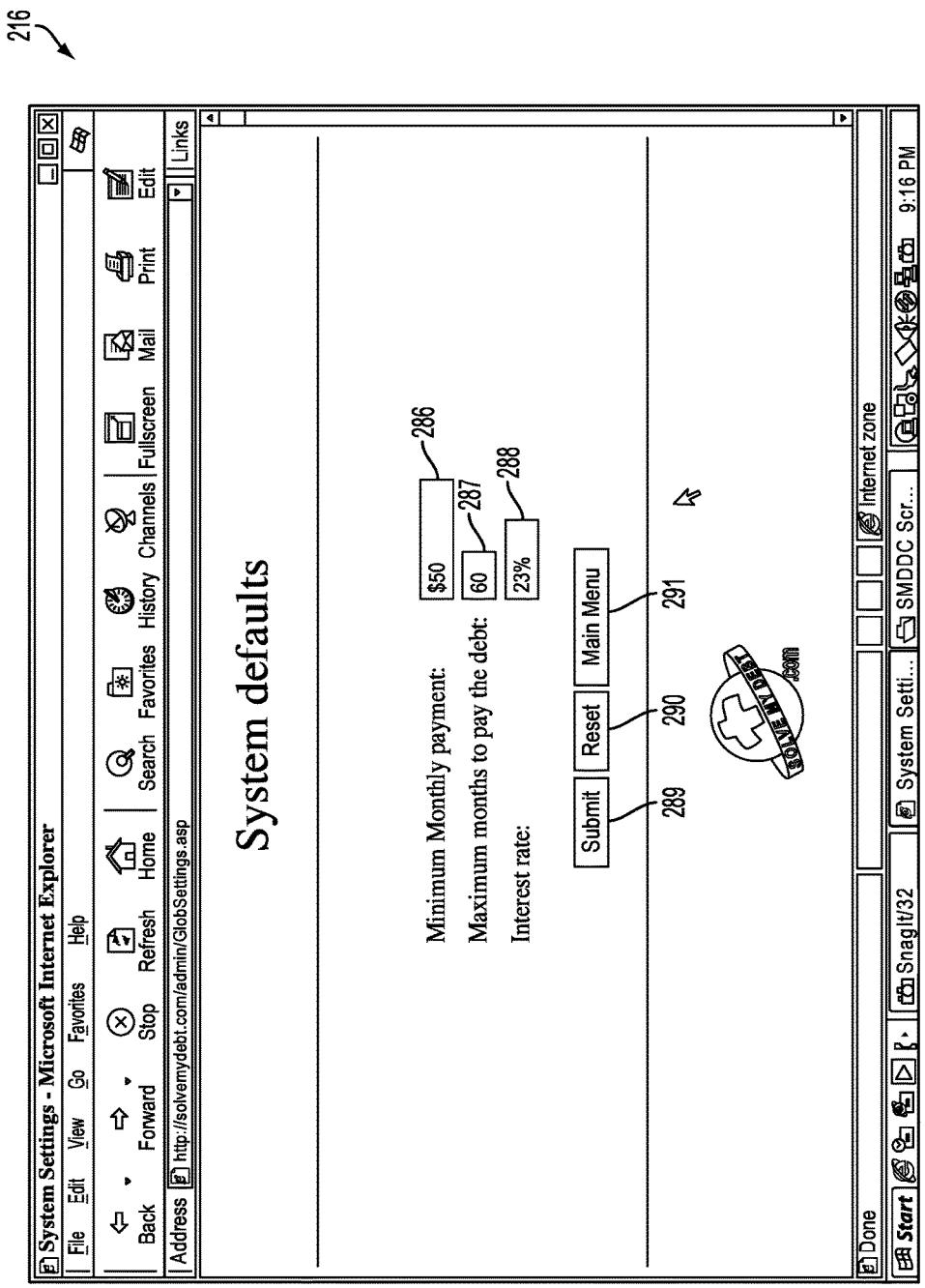
FIG. 16 depicts the Systems Settings Screen, which illustrates system default settings as input by the collector.

A user may also input default settings for the system. FIG. 16 depicts the Systems Settings Screen, which provides information fields for the default settings. The user inputs minimum monthly payment information in "Minimum Monthly Payment 286," the maximum number of months permitted to repay the debt in "Maximum Months to Pay the Debt 287," and the applicable interest rate in "Interest Rate 288." "Submit 289" allows the user to submit the system settings, while "Reset 290" permits the user to reset the system. "Main Menu 291" allows the user to return to the system's main menu.

Figure 17:
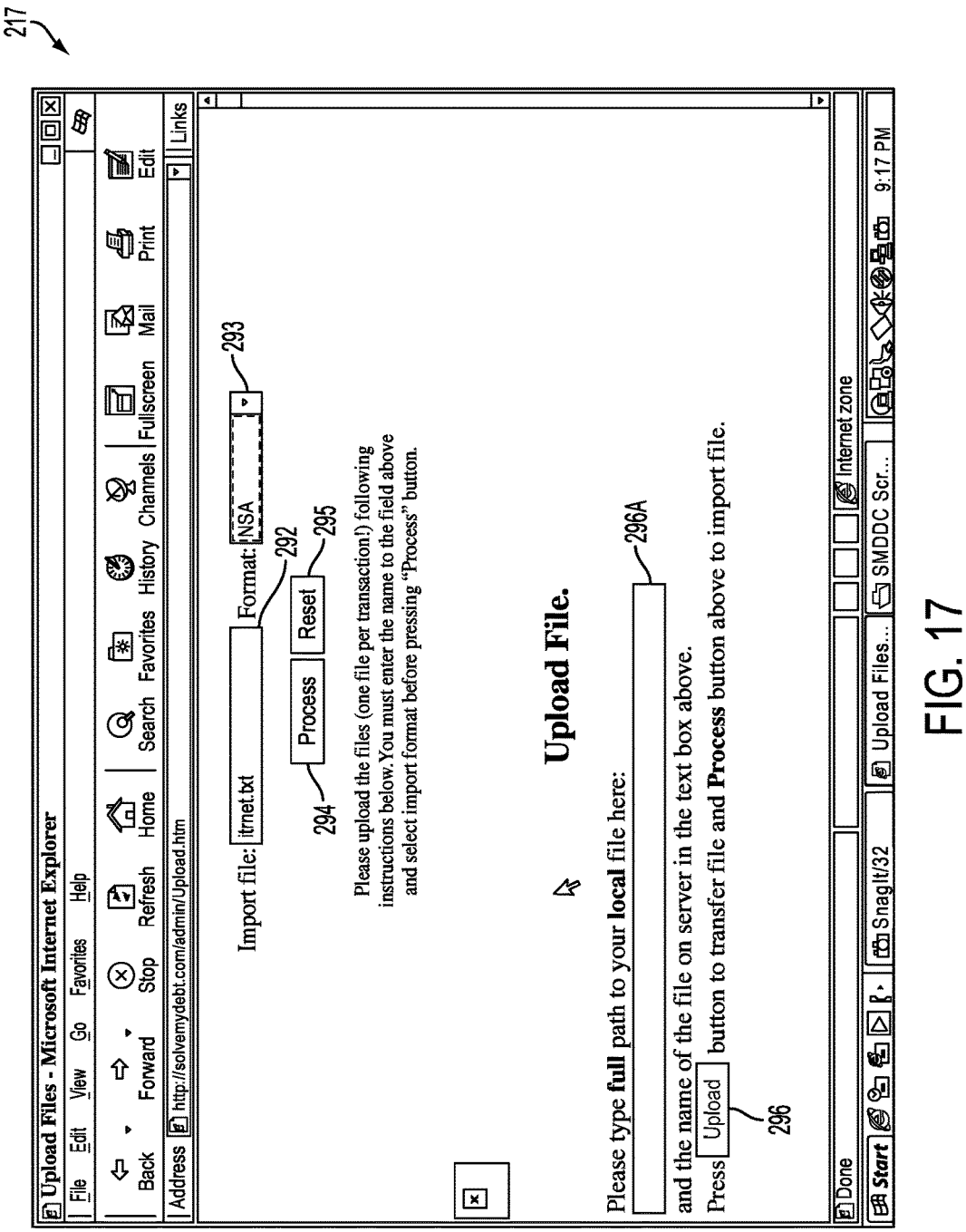
FIG. 17 depicts the Upload Data screen, which permits the collector to select a file and its format, as well as to process it.

FIG. 17 depicts the Upload Data screen, which permits the creditor to prepare data offline, and then upload that data to the system for the convenient customization of the debt presentment system. The user can input a file name via "Import File 292," select the file format under "Format 293," process and import the file with the "Process 2941" feature, and reset the system using "Reset 295." A file is uploaded using "Upload Button 296," and the user can input the full path to the local file using ""Full Path to Local File 296A."

Figure 18:
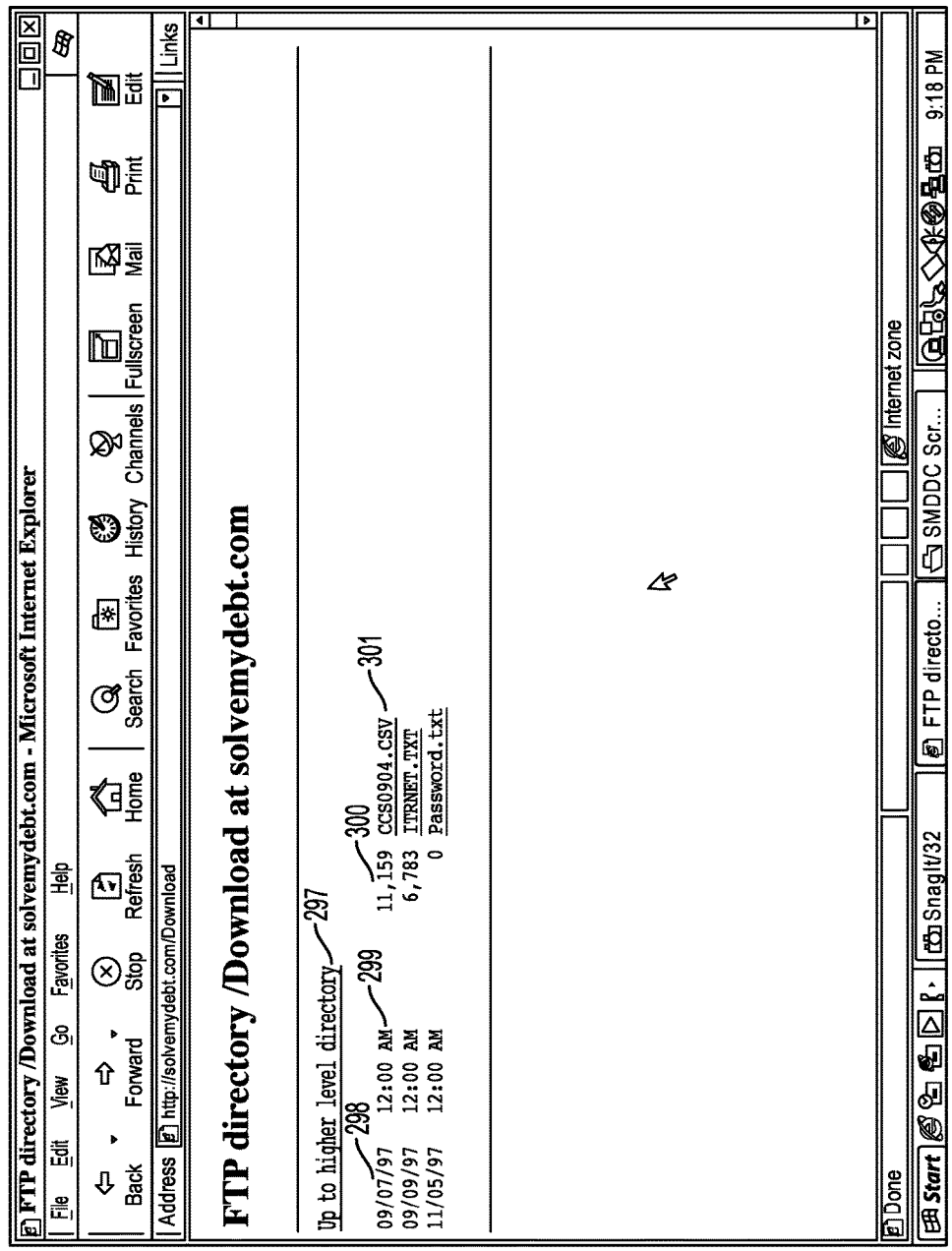
FIG. 18 depicts the Download Results screen, allowing the user to keep track of any information that is downloaded.

To keep track of downloaded information, a user can access FIG. 18, which depicts the Download Results screen. The download results are illustrated using "Download Results 297." The date, time, characteristics and file name of the downloaded results are accessed using "Date 298," "Time 299," "Characteristics 300," and "File Name 301," respectively.

Figure 19:
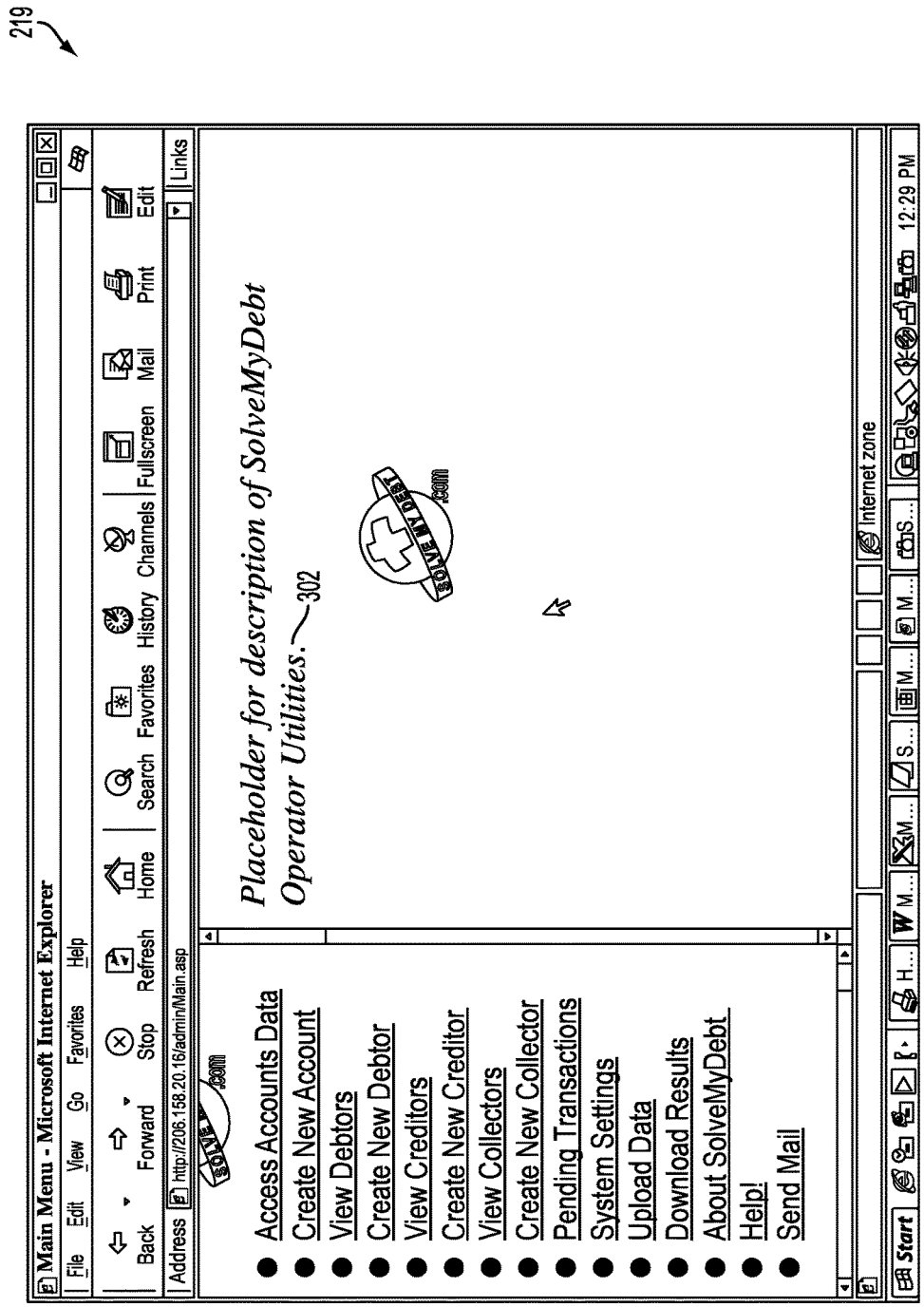
FIG. 19 depicts the "About SolveMyDebt.com" screen, which provides the user with information about the system.

A user can access general information about the system through the "About SolveMyDebt.com" screen, as depicted in FIG. 19. Using "SolveMyDebt.com 302," the user can access descriptions of the operator utilities.

Figure 20:
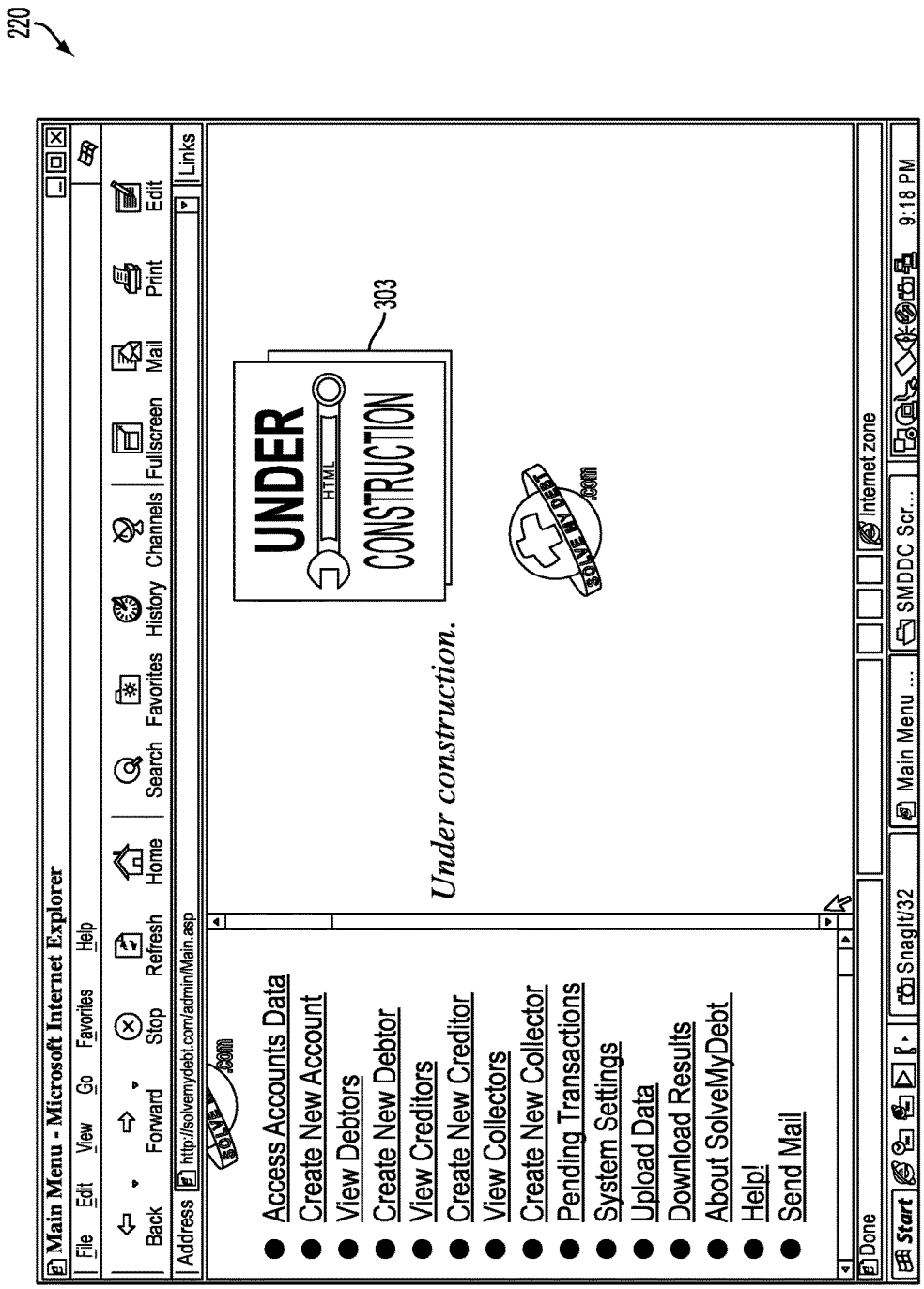
FIG. 20 depicts the Administration Help screen, which gives the user the opportunity to access the system's Help feature.

A user who seeks assistance with any of the system's features can access the screen depicted in FIG. 20, the Administration Help screen. With "Access to Help and Instructions for System Administration 303," the user reaches an illustration of the system's help screen for administration.

Figure 21:
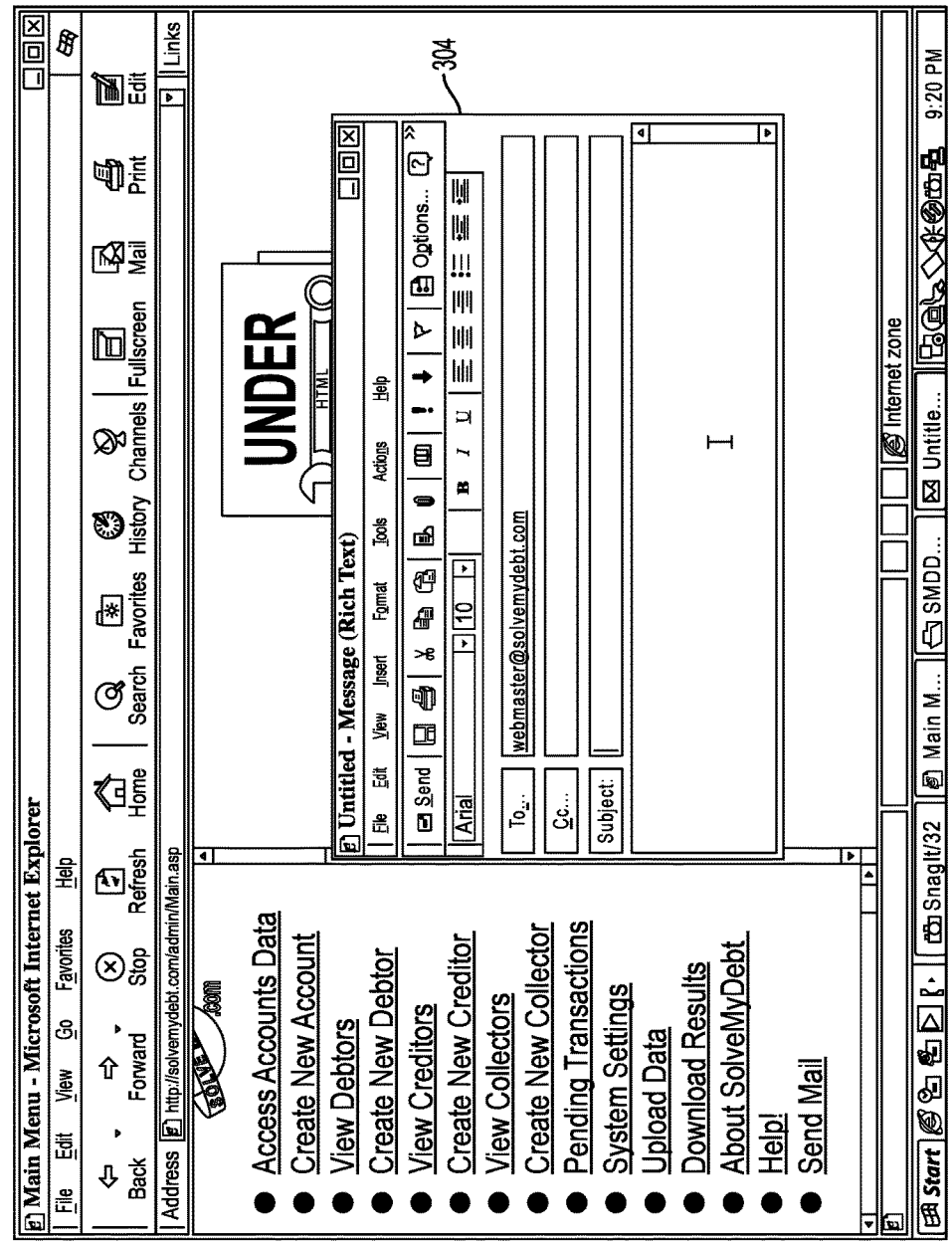
FIG. 21 depicts the Send Mail screen, which allows the user to send Email.

Should the user wish to send Email, he or she may do so through the Send Mail screen, as depicted in FIG. 21. "Pre-Addressed e-mail ready to fill in and send 304" illustrates the send mail screen for administration support.

When a debtor receives a notice from a collection agency regarding an overdue payment, it will typically resemble the one shown in FIG. 22. The notice depicted in this Figure informs the debtor of the SolveMyDebt.com service, and invites the payor to access the cite.

Figure 23:
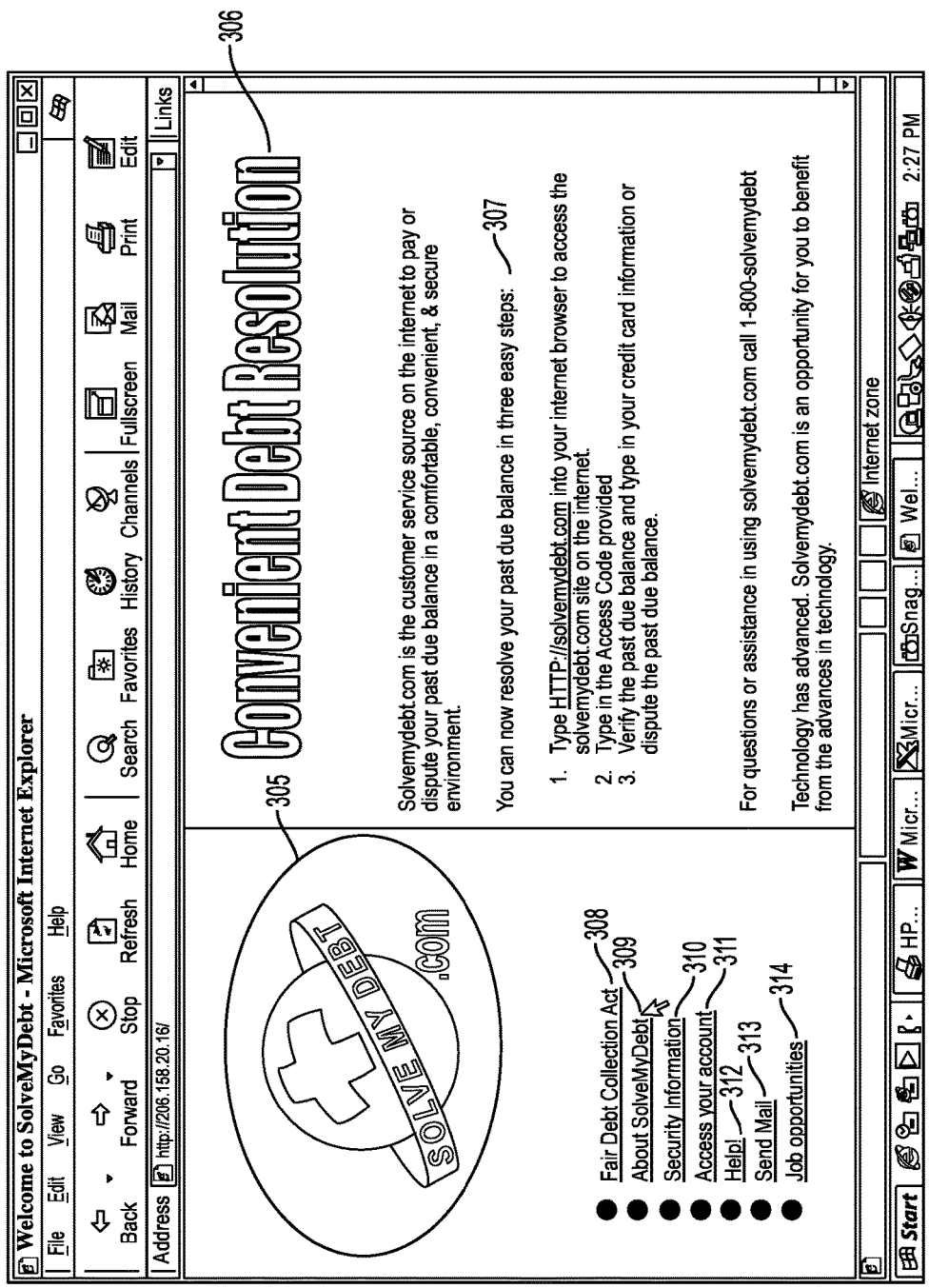
FIG. 23 depicts the screen a consumer first encounters upon entering the system.

The debtor who chooses to visit the website will encounter FIG. 23, which depicts the screen a consumer first meets upon entering the system. "Branding 305" portrays the visual/graphic and audio content that differentiates one system deployment from another, and it can be dynamic based on the demographic characteristics of the consumer to maximize communication effectiveness (including multilingual, multicultural, etc.). "Advertising 306" illustrates the advertising (which can be dynamic) in the generic debt collection embodiment. The user encounters an illustration of system construction information and information for compliance with the Fair Debt Collection Practice Act with "Instructions and FDCPA if necessary 307" (the information is based on the locality of the debtor to comply with fair debt collection laws). The screen provides the user with hyperlinks to a variety of system resources via "Hyperlink to FDCPA 308," "Hyperlink to About SolveMyDebt.com 309," "Hyperlink to Security and Privacy Info. 310," "Hyperlink to Access Account 311," "Hyperlink to Help 312," "Hyperlink to Send Mail 313," and "Hyperlink to Job Opportunities 314."

Figure 24:
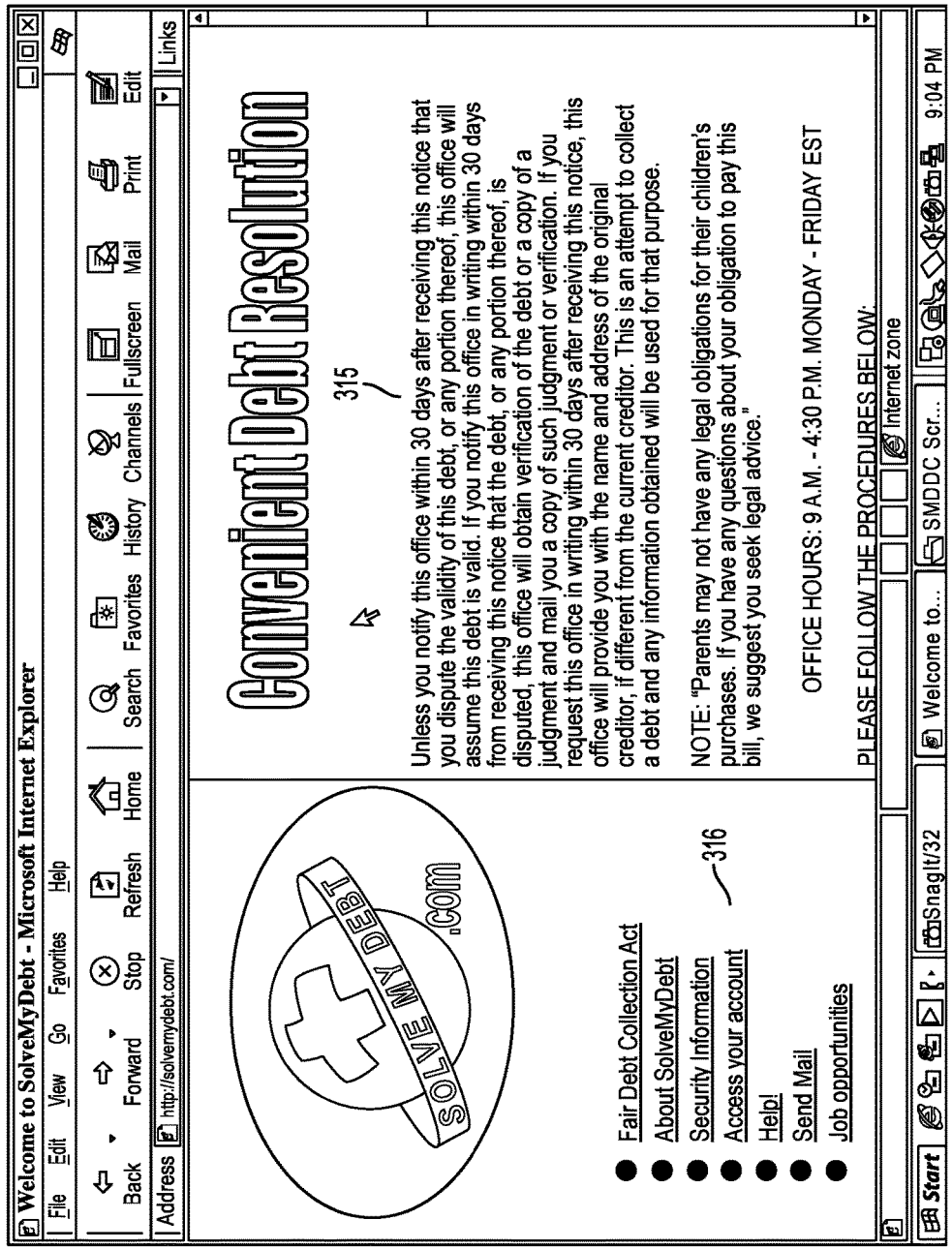
FIG. 24 provides information for the user regarding compliance with the Fair Debt Collection Practice Act.

A debtor who seeks detailed information regarding the FDCPA will link to FIG. 24. "FDCPA Information 315" illustrates information for compliance with the FDCPA. The information is dynamic based on locality of debtor to comply with fair debt collection laws. "Hyperlinks 316" represents hyperlinks to about SolveMyDebt.com, security information, access to the user's account, help, and send mail.

Figure 25:
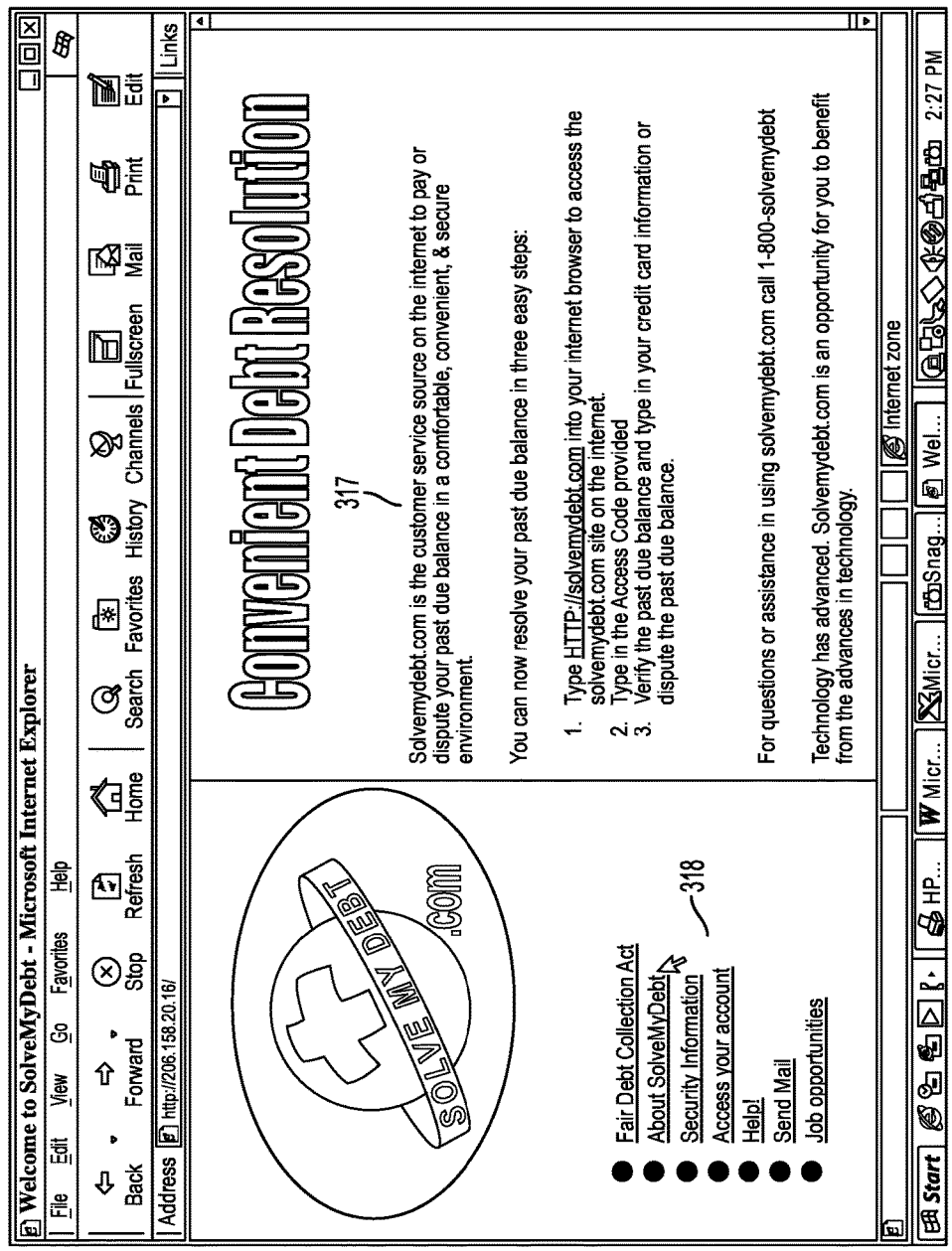
FIG. 25 represents the About SolveMyDebt.com screen, providing the user with information about the system.

A consumer who seeks detailed information about the system itself will link to FIG. 25, which represents the About SolveMyDebt.com screen. "SolveMyDebt.com 317" is a hyperlink to information about the SolveMyDebt.com transaction community and, where necessary, information for compliance with the Fair Debt Collection Practice Act. "Hyperlinks 318" provides access to about SolveMyDebt.com, security information, a user's account, help, send mail, and job opportunities.

Figure 26:
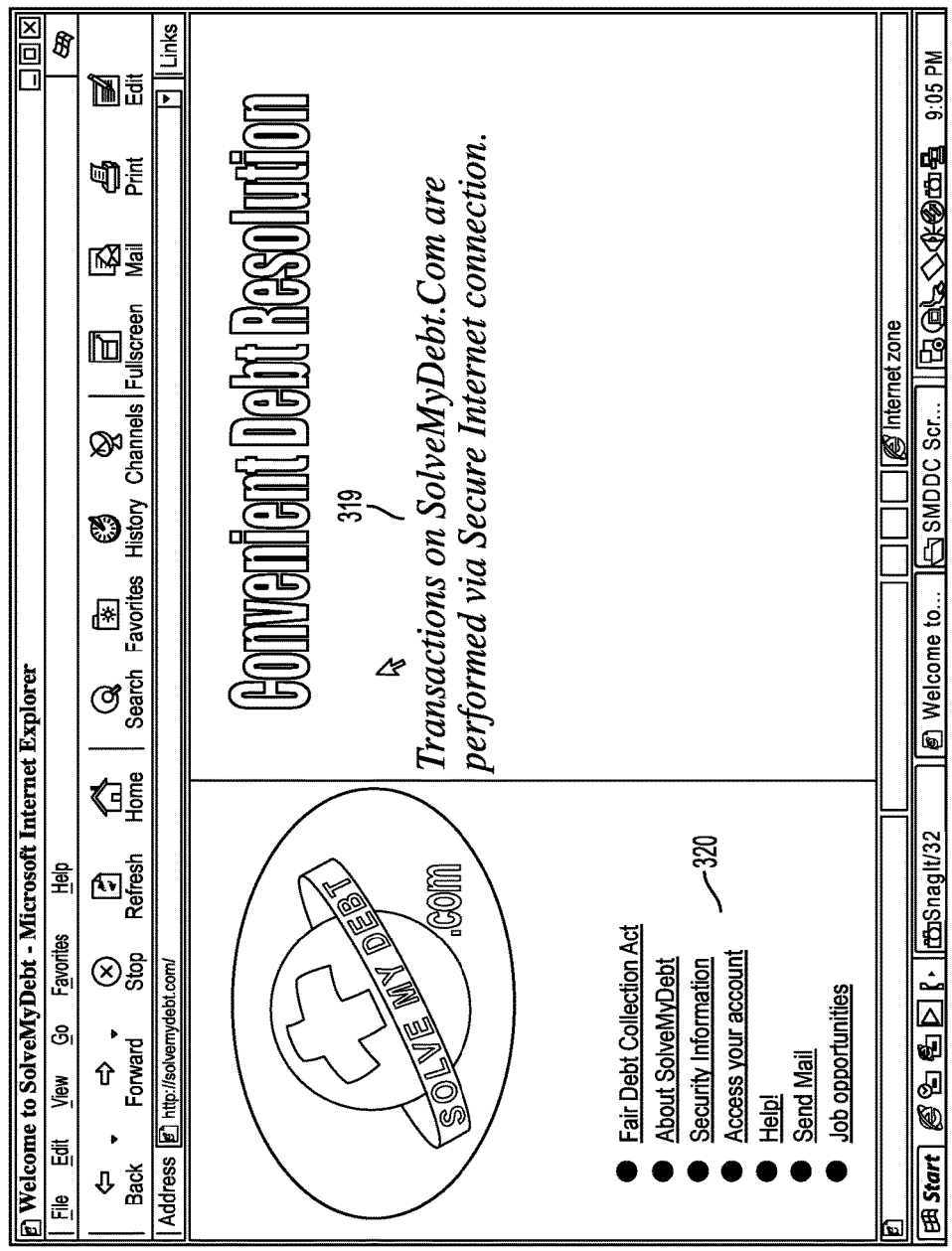
FIG. 26 embodies the Security and Privacy screen, which leaves the user with detailed information regarding the system's security features.

FIG. 26 represents the Security and Privacy screen, to which a consumer who requires more detailed material regarding the privacy of his or her transactions can link. The user can access information regarding security and privacy policies within the SolveMyDebt.com transaction community using "Security and Privacy Information 319." The screen also provides links to about SolveMyDebt.com, security information, access your account, help, send mail, and job opportunities through "Hyperlinks 320."

Figure 27:
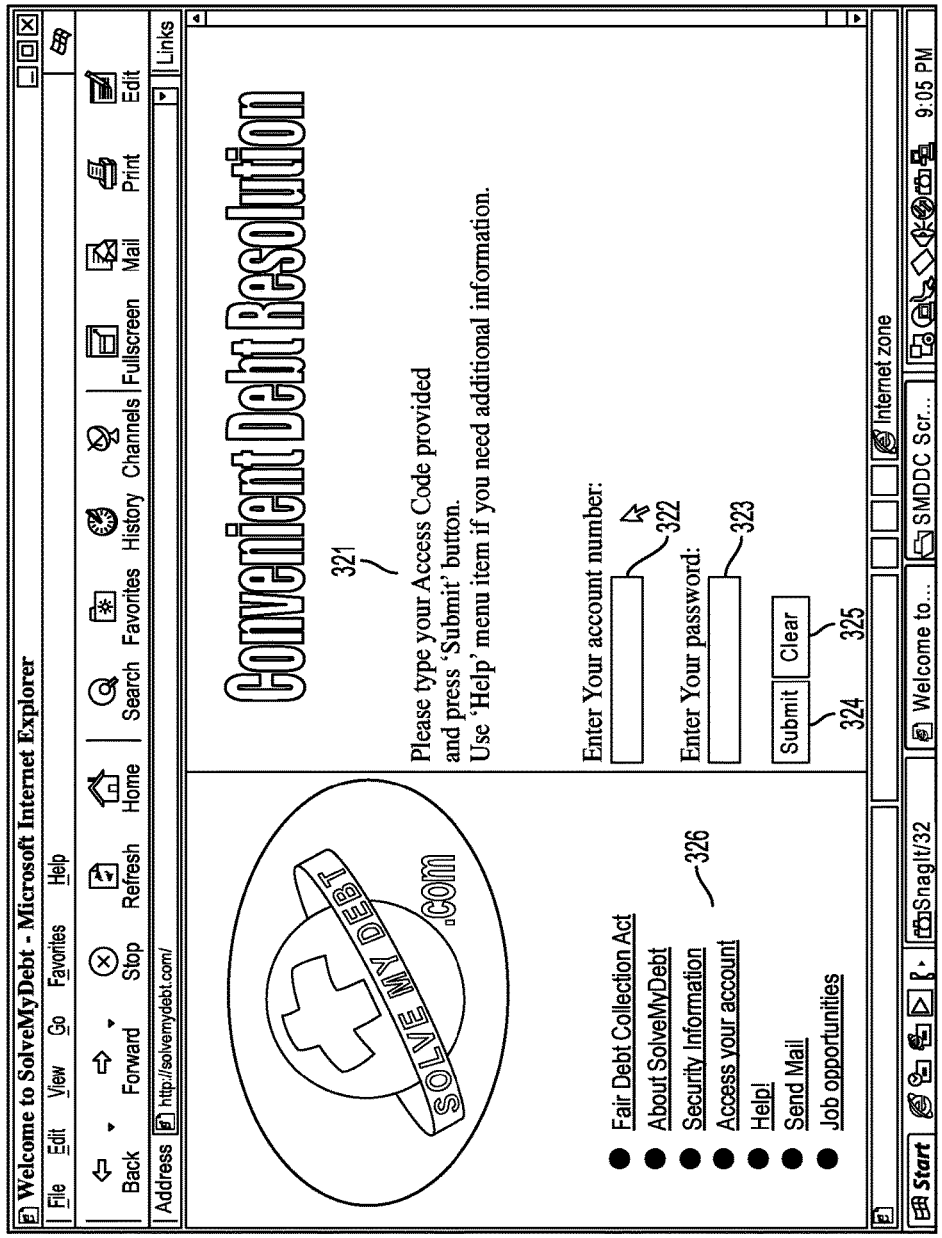
FIG. 27 delineates the Access Your Account screen, providing users with the means to enter their accounts.

A consumer who wishes to utilize the system can link to FIG. 27, which delineates the Access Your Account screen. To gain entry into an account, the user follows the directions provided by "Instructions 321," then proceeds to input the user's account number in "Enter Your Account Number 322," and passcode in"Enter Your Passcode 323." To access the account, the user submits the account number and passcode via "Submit 324." The user also has the opportunity to clear the account number and passcode using "Clear 325." The screen also provides "Hyperlinks 326," which links a user to information regarding about SolveMyDebt.com, security information, accessing one's account, help, sending mail, and job opportunities.

Figure 28:
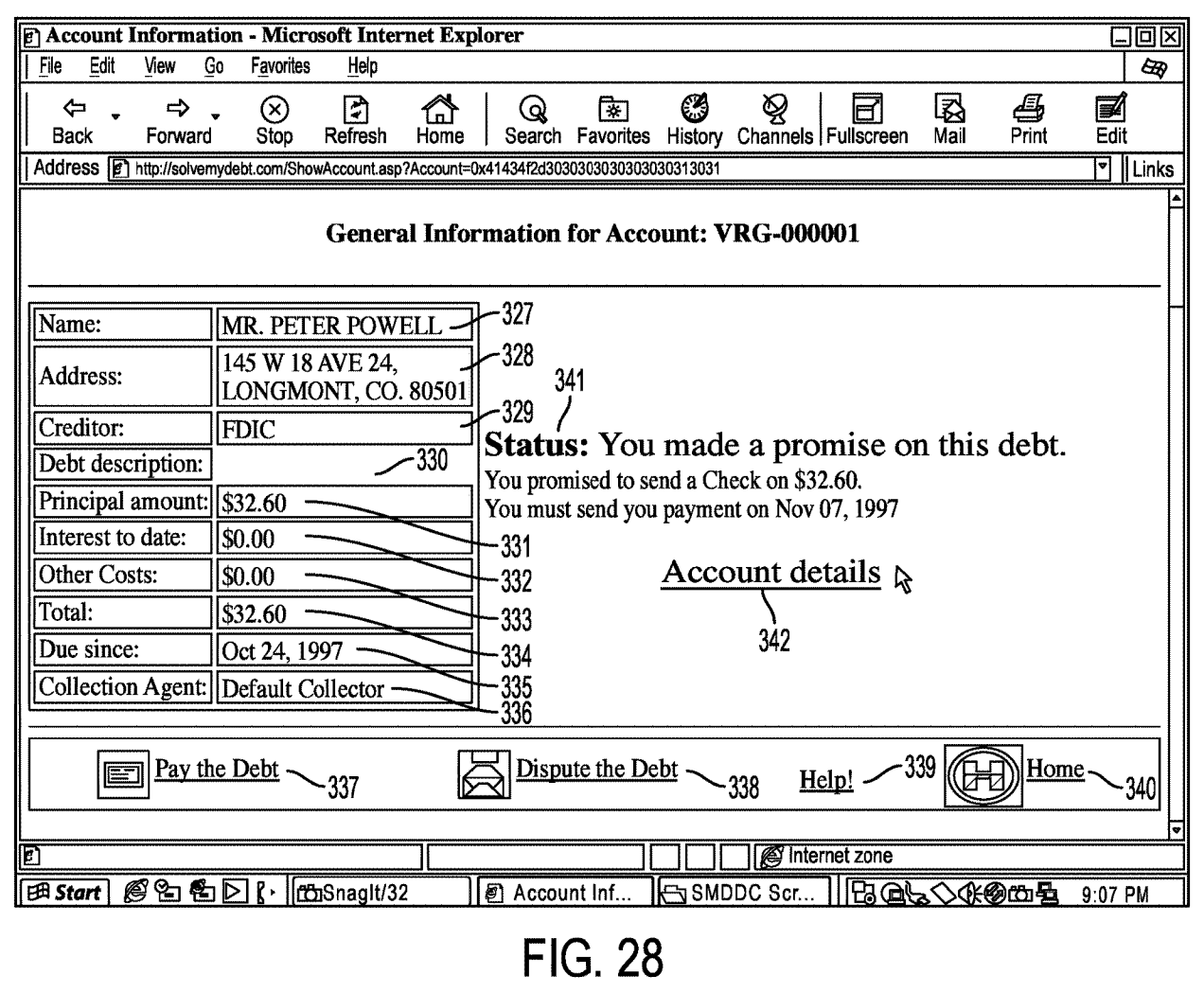

Once the proper name and password have been processed, the user will reach FIG. 28, which illustrates the Account Information screen. On this screen, the user will find information regarding: "Name 327," "Address 328," "Creditor 329," "Debt Description 330," "Principal Amount 331," "Interest to Date 332," Other Costs 333," and "Total 334." The user can also determine when repayment was due with "Due Since 335" the identity of the collection agent using "Collection Agent 336." The user has the option of either settling the debt under "Pay the Debt 337," or disputing the debt via "Dispute the Debt 338." "Help 339" and "Home 340" provide the user with hyperlinks to the help information screen and to the SolveMyDebt.com homepage, respectively. The debt's status can be ascertained using "Status 341." "Account Details 342" provides a hyperlink to the account details information screen.

Figure 29:
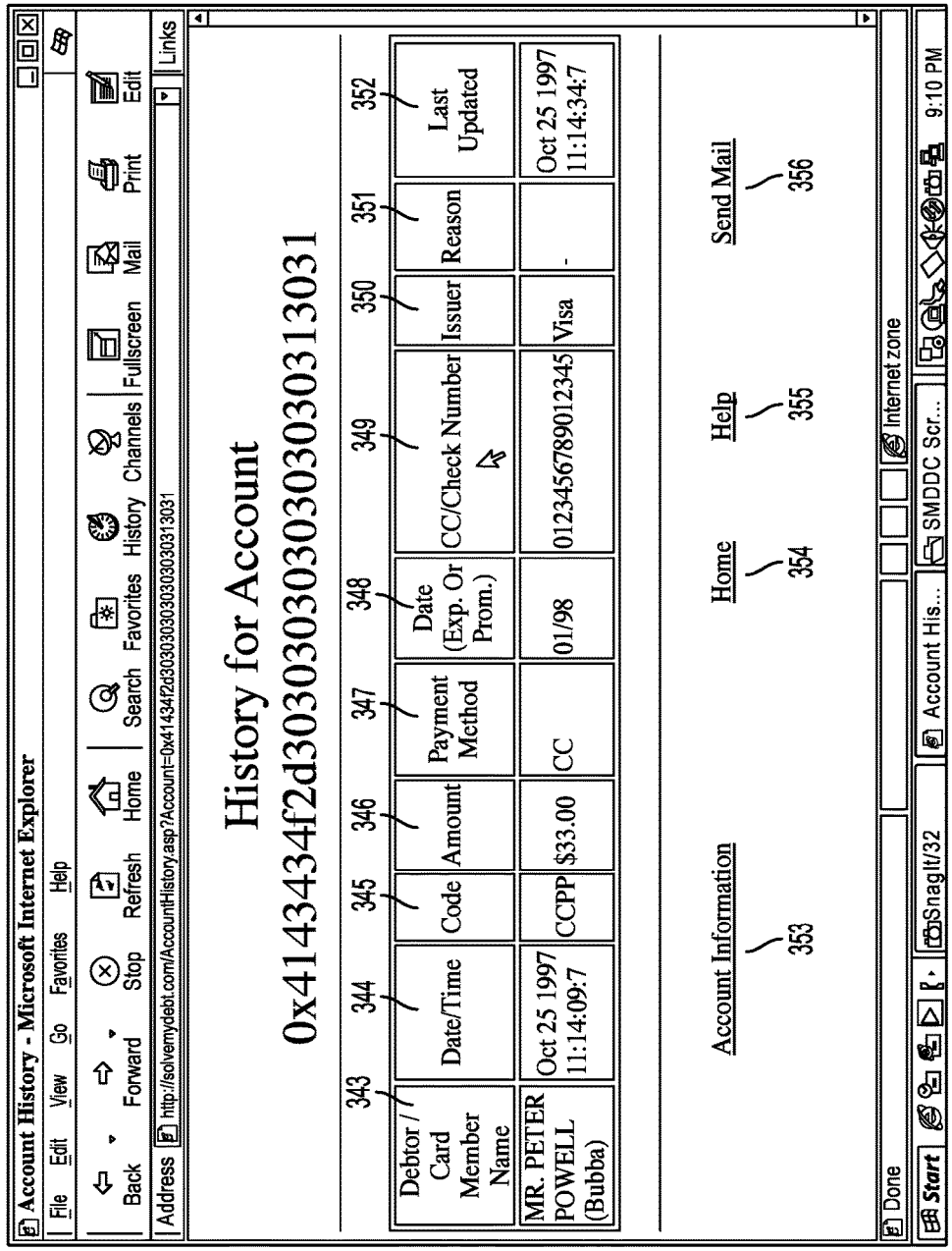
FIG. 29 depicts the Account Details screen, which reveals more detailed information regarding the user's account.

If the consumer seeks more detailed information regarding the account, he or she can access FIG. 29, which depicts the Account Details screen. Information on this screen provides the user with the particulars of the debt, including: "Debtor/Card Member Name 343," "Date/Time 344," "Code 345," "Amount 346," "Payment Method 347," "Date (Exp. Or Prom.) 348," "CC/Check Number 349," "Issuer 350," "Reason 351," and "Last Updated 352." The screen also furnishes hyperlinks to the account information screen with "Account 353," the SolveMyDebt.com homepage using "Home 354," the system's help feature with "Help 355," and the send mail feature with "Send Mail 356."

Figure 30:
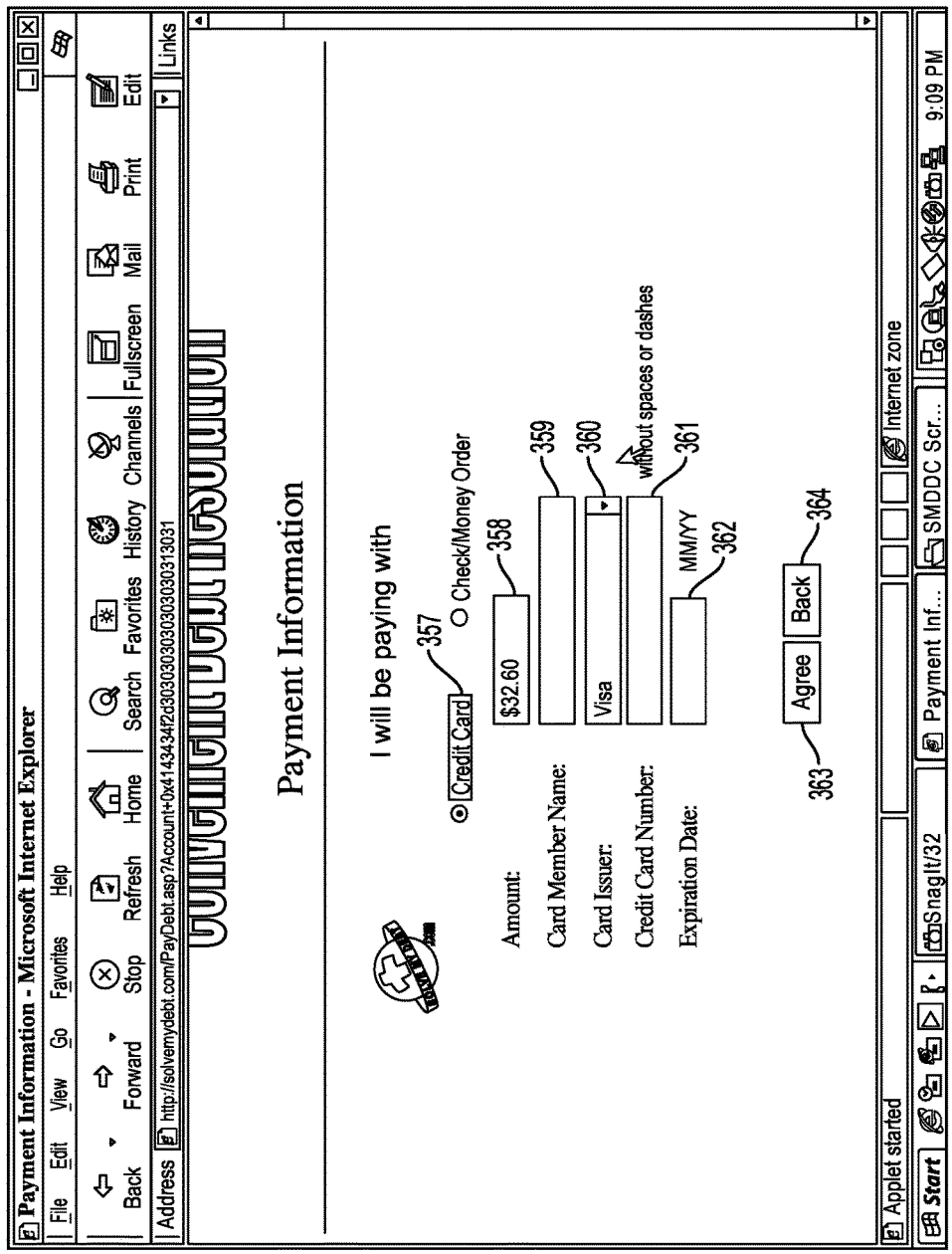
FIG. 30 illustrates the screen a user encounters when paying a debt by credit card.

Once the consumer decides to pay the debt, he or she can pay by credit card, check or money order. FIG. 30 illustrates the screen a user encounters when paying a debt by credit card. The user selects this choice of payment method with "Payment Method 357." The amount owed is depicted within the "Amount 358" field. Information regarding the user's credit card is input by the user into the "Card Member Name 359," "Card Issuer 360," "Credit Card Number 361,"

and "Expiration Date 362" fields. The user manifests assent to the specified payment arrangement with "Agree 363." "Back 264" is a means for the user to go back on the payment arrangement screen.

Figure 31:
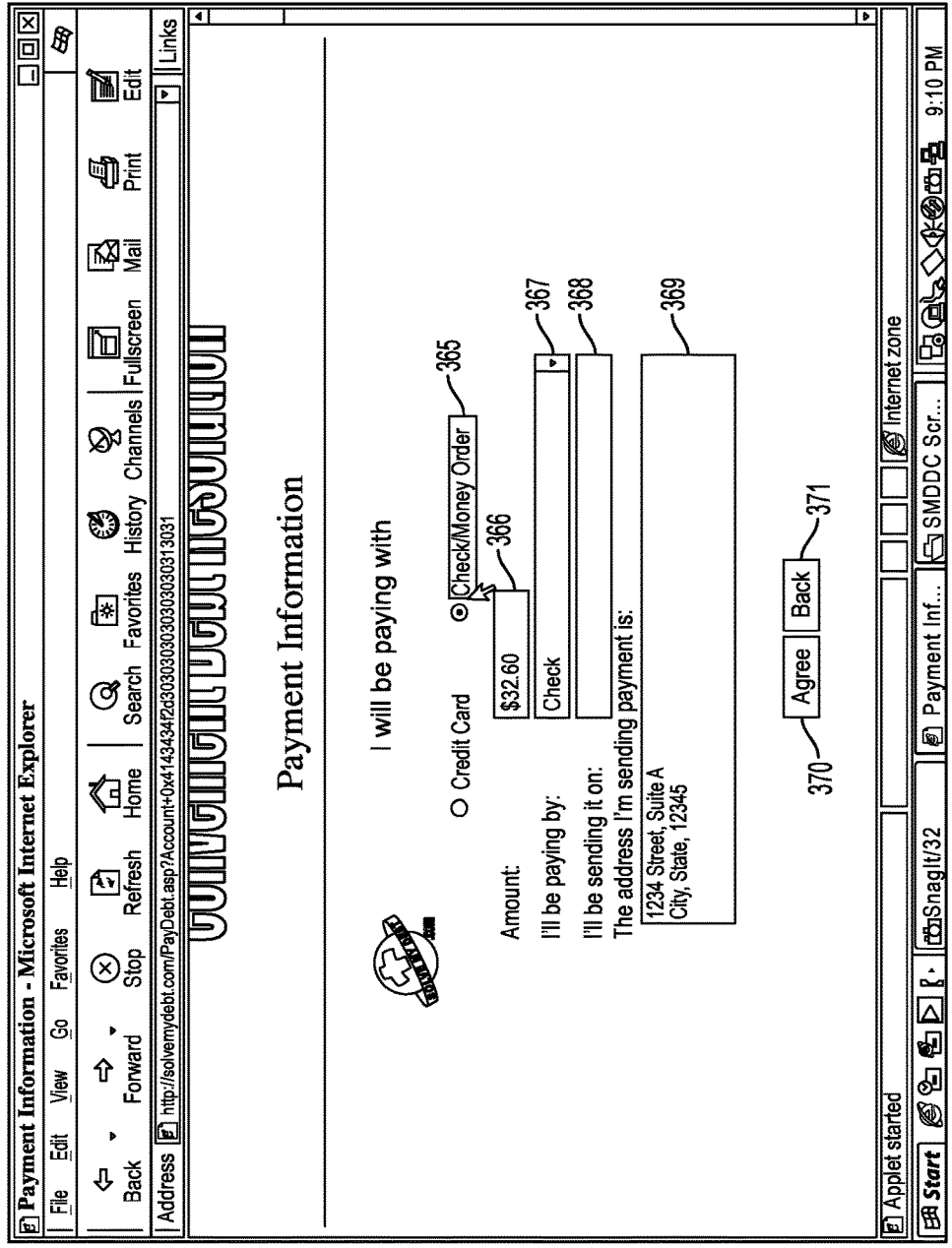
FIG. 31 illustrates the screen a user encounters when paying a debt by check or money order.

FIG. 31 illustrates the screen a user encounters when paying a debt by check or money order. The user selects this choice of payment with "Payment Method 365." An illustration of the amount owed is found in "Amount 366." The payment type selected, the sending date, and the address to which payment is being sent are illustrated in the "I'll be paying by 367," "I'll be sending it on 368" and "the address I'm sending payment is" fields, respectively. The user assents to the specified payment arrangement using "Agree 370," or may go back on the payment arrangement screen using "Back 371."

Figure 32:
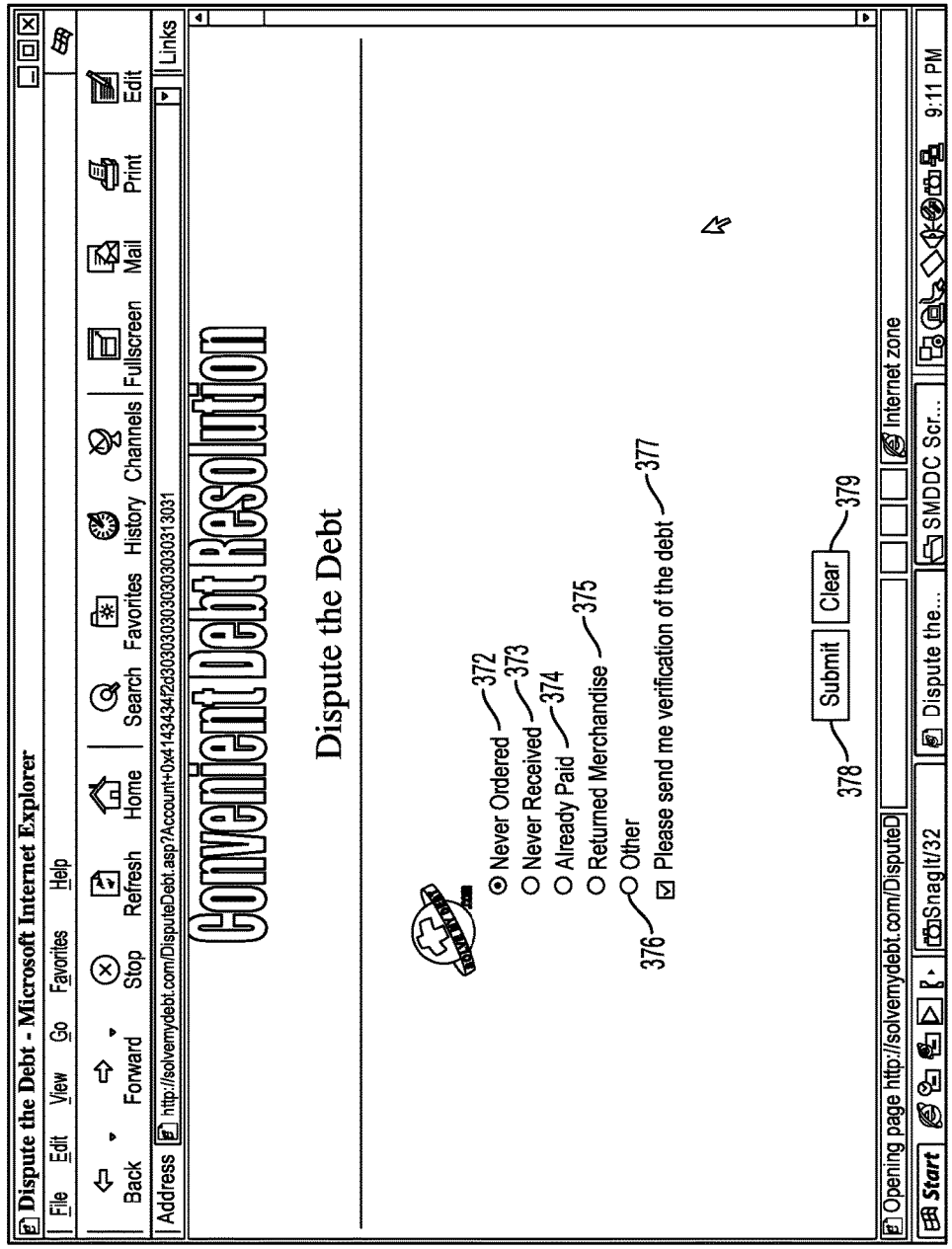
FIG. 32 depicts the screen on which a user disputes a debt.

If the consumer feels that the overdue payment with which he or she is charged is erroneous, then the consumer may choose to dispute the debt. FIG. 32 depicts the screen which allows a user to dispute a debt. The user chooses from a list of reasons for the dispute, listed as: "Never Ordered 372," "Never Received 373," "Already Paid 374," "Returned Merchandise 375," and "Other 376." The user may also request a verification of the debt, using "Please send me verification of the debt 377." The user then submits the reason for dispute using "Submit 378," or may choose to clear the dispute screen with "Clear 379."

Figure 33:
FIG. 33 depicts the screen encountered by a user who selects "Other 376" (from FIG. 31) as the reason for disputing the debt, and affords the user the opportunity to communicate the reasons a debt has not been paid.

FIG. 33 depicts the screen encountered by a user who selects "Other 3761" (from FIG. 31) as the reason for disputing the debt. This screen illustrates "Never Ordered 380," "Never Received 381," "Already Paid 382," and "Returned Merchandise 383," all as seen on the debt dispute screen from FIG. 31. "Other 384" is an illustration of the "other" reason selection on the debt dispute screen, as well. "Input Area for Other Reason 3851" depicts the field available to input the other reason for disputing the debt. The reason may be reviewed by live collectors or a collection agency which utilizes artificial intelligence. "Please send me verification of the debt 386" allows the user to request documentation of the debt. The user then submits the reason for dispute using "Submit 387," or may choose to clear the dispute screen with "Clear 388."

What is claimed is:

1. A method for gathering information pertinent to a debt for purposes of compiling a transaction settlement offer set of a plurality of offers for settling and resolving the debt, the method performed using a computing device and comprising: collecting credit information including information about a user's current financial condition using a server for use in compiling the transaction settlement offer set according to a set of predetermined offer set rules, the transaction settlement offer set comprising a plurality of individually selectable monetary offers each comprising different decisioned monetary settlement terms specifically determined for the user based on the set of predetermined offer set rules and collected credit information including available information about the user's current financial condition and further determined to facilitate settlement of the debt by modifying existing terms of the debt without providing a new debt instrument to the user using terms of one individually selectable monetary offer selected by the user, wherein a payment option includes secure acceptance of checks through the integration of an automated customer check printing means into an Internet transaction system; and wherein upon selection of one offer by the user, the server obtains user payment information and processes at least a portion of the one offer selected by the user;

wherein the collecting credit information including information about the user's current financial condition using the server comprising employing the server to perform at least one from a group comprising:

seeking credit information related to personal data regarding the user from a personal data source separate from the user, a user device, and the server;

seeking credit information related to account data regarding a user account from an account data source separate from the user, the user device, and the server;

seeking information related to macroeconomic data from a macroeconomic source separate from the user, the user device, and the server; and seeking credit information related to the debt from a transaction data source separate from the user, the user device, and the server.

2. A system configured to gather information pertinent to a debt for purposes of compiling a transaction settlement offer set of at least one offer for settling the debt, the system comprising:

a server configured to seek credit information including information about a user's current financial condition for use in compiling the transaction settlement offer set according to a set of predetermined offer set rules, the transaction settlement offer set comprising a plurality of individually selectable monetary offers each comprising different decisioned monetary settlement terms specifically determined for the user based on the set of predetermined offer set rules and available information about the user's current financial condition, and further determined to facilitate settlement of the debt, each individually selectable monetary offer selectable by the user to establish settlement of the debt by modifying existing terms of the debt without providing a new debt instrument to the user using terms of one individually selectable monetary offer selected by the user, wherein a payment option includes secure acceptance of checks through the integration of an automated customer check printing means into an Internet transaction system; and wherein upon selection of one offer by the user, the server obtains user payment information and processes at least a portion of the one offer selected by the user; and a memory configured to store information related to the debt; wherein the server is configured to seek at least one from a group comprising: credit information related to personal data regarding the user; credit information related to account data regarding a user account; information related to macroeconomic data; and credit information related to the debt;

wherein said server is further configured to seek information from a source separate from the server and the user and a user device.

3. A method for gathering information pertinent to a debt for purposes of compiling a transaction settlement offer set of at least one offer to a user for purposes of settling the debt, the method performed using a computing device and comprising:

collecting credit information including information about a user's current financial condition using a server for use in compiling the transaction settlement offer set according to a set of predetermined offer set rules, the transaction settlement offer set comprising a plurality of individually selectable monetary offers each comprising different decisioned monetary settlement terms specifically determined for the user based on the set of predetermined offer set rules and available information about the user's current financial condition, and further determined to facilitate settlement of the debt, each individually selectable monetary offer selectable by the user to establish settlement of the debt by modifying existing terms of the debt without providing a new debt instrument to the user using terms of one individually selectable monetary offer selected by the user, wherein a payment option includes secure acceptance of checks through the integration of an automated customer check printing means into an Internet transaction system; and wherein upon selection of one offer by the user, the server obtains user payment information and processes at least a portion of the one offer selected by the user;

wherein the collecting credit information using the server comprises employing the server to perform at least one from a group comprising:

seeking credit information related to personal data regarding the debtor user from a credit source separate from the debtor, a debtor device, and the server;

seeking credit information related to account data regarding a debtors account from a financial source separate from the debtor, the debtor device, and the server;

seeking information related to macroeconomic data from a macroeconomic source separate from the debtor, the debtor device, and the server; and seeking credit information related to data regarding the debt from a data source separate from the debtor, the debtor device, and the server.

\* \* \* \* \*